(12) United States Patent
Heins et al.

(10) Patent No.: US 7,716,286 B2
(45) Date of Patent: May 11, 2010

(54) METHOD AND APPARATUS FOR UTILITY COMPUTING IN AD-HOC AND CONFIGURED PEER-TO-PEER NETWORKS

(76) Inventors: Douglas B. Heins, 540 Delancey St., Loft 305, San Francisco, CA (US) 94107; Gregory M. Morey, 38 E. 1st St., New York, NY (US) 10003

( * ) Notice: Subject to any disclaimer, the term of this patent is extended or adjusted under 35 U.S.C. 154(b) by 0 days.

(21) Appl. No.: 12/496,781

(22) Filed: Jul. 2, 2009

(65) Prior Publication Data
US 2009/0259720 A1 Oct. 15, 2009

Related U.S. Application Data

(63) Continuation-in-part of application No. 10/733,830, filed on Dec. 10, 2003, now Pat. No. 7,610,207.

(60) Provisional application No. 61/109,730, filed on Oct. 30, 2008, provisional application No. 61/079,644, filed on Jul. 10, 2008.

(51) Int. Cl.
G06F 15/16 (2006.01)

(52) U.S. Cl. .................. 709/204; 709/201; 709/205; 709/220; 709/223; 709/225; 709/226; 709/229; 717/174

(58) Field of Classification Search ............... 709/201, 709/204, 205, 220, 223, 225, 226, 229; 717/174
See application file for complete search history.

(56) References Cited

U.S. PATENT DOCUMENTS

| | | | |
|---|---|---|---|
| 5,606,493 A | 2/1997 | Duscher et al. | |
| 5,778,227 A | 7/1998 | Jordan | |
| 6,128,647 A | 10/2000 | Haury | |
| 6,782,398 B1 | 8/2004 | Bahl | |
| 6,832,223 B1 | 12/2004 | Scheifler et al. | |
| 7,043,522 B2 | 5/2006 | Olson et al. | |
| 7,120,558 B2 * | 10/2006 | McIntyre et al. | ............ 702/183 |
| 7,136,927 B2 | 11/2006 | Traversat et al. | |
| 7,174,370 B1 | 2/2007 | Saini et al. | |
| 7,174,381 B2 | 2/2007 | Gulko et al. | |

(Continued)

OTHER PUBLICATIONS

Peer-to-Peer Techniques for Data Distribution in Desktop Grid Computing Platforms, Costa et al., Proceedings of the CoreGRID Workshop on Programming Models Grid and P2P System Architecture Grid Systems, Tools and Environments, pp. 1-12, Aug. 30, 2007.

(Continued)

*Primary Examiner*—Liangche A Wang
(74) *Attorney, Agent, or Firm*—DLA Piper LLP (US)

(57) ABSTRACT

Executing a program structure by leveraging a peer-to-peer network comprises generating a program structure comprising a plurality of program instructions. A first of a plurality of network peers then executes a portion of the program instructions which initiates the execution of code hosted by said first network peer, where said portion comprising fewer than all program instructions. The first network peer then migrates one or more of the program instructions, together with any requisite data, to at least one other of the plurality of network peer. The at least one other network peer then continues execution of the program structure until one or more of the objections of the program structure are achieved.

18 Claims, 7 Drawing Sheets

U.S. PATENT DOCUMENTS

| | | | |
|---|---|---|---|
| 7,200,848 | B1 | 4/2007 | Slaughter et al. |
| 7,285,047 | B2 | 10/2007 | Gelb et al. |
| 7,315,791 | B2 | 1/2008 | Ilie et al. |
| 7,395,536 | B2 | 7/2008 | Verbeke et al. |
| 7,404,195 | B1 | 7/2008 | Sawicki et al. |
| 7,496,911 | B2 * | 2/2009 | Rowley et al. ............... 717/174 |
| 2002/0073153 | A1 * | 6/2002 | Miller ........................ 709/205 |
| 2003/0074426 | A1 * | 4/2003 | Dervin et al. ............... 709/220 |
| 2003/0084435 | A1 * | 5/2003 | Messer et al. ............... 717/174 |
| 2004/0019890 | A1 | 1/2004 | Verbeke et al. |
| 2006/0155802 | A1 | 7/2006 | He et al. |
| 2006/0265710 | A1 | 11/2006 | Ansari |
| 2007/0050261 | A1 | 3/2007 | Lin |
| 2007/0112574 | A1 | 5/2007 | Greene |
| 2007/0142033 | A1 | 6/2007 | Deas et al. |
| 2007/0255782 | A1 | 11/2007 | Tannenbaum et al. |
| 2009/0125637 | A1 | 5/2009 | Matuszewski |
| 2009/0125919 | A1 | 5/2009 | Meijer et al. |

OTHER PUBLICATIONS

"Framework for Peer-to-Peer Distributed Computing in a Heterogeneous, Decentralized Environment," Verbeke et al., Proceedings of the Third International Workshop on Grid Computing, 2002.

"A Peer-to-Peer Computing Framework: Design and Performance Evaluation of YML," Delannoy et al., Parallel and Distributed Computing, 2004.

"Coordinated Learning to Support Resource Management in Computational Grids," Lynden et al., Peer-to-Peer Computing, 2002.

Rheeve: A Plug-N-Play Peer-to-Peer Computing Platform, Poon et al., Distributed Computing Systems Workshops, 2002.

"Resource Sharing," Varma, IEEE Potentials, pp. 14-16, 2004.

"Pure Peer-to-Peer Desktop Grid Framework with Efficient Fault Tolerance," El-Desoky et al., Computer Engineering & Systems, 2007.

* cited by examiner

METHOD AND APPARATUS FOR UTILITY COMPUTING IN AD-HOC AND CONFIGURED PEER-TO-PEER NETWORKS

RELATED APPLICATIONS

This application is a Continuation-in-Part of U.S. patent application Ser. No. 10/733,830 filed Dec. 10, 2003 and also claims priority to U.S. Application No. 61/109,730 filed on Oct. 30, 2008 and U.S. Patent Application No. 61/079,644 filed on Jul. 10, 2008, the entire contents of which are incorporated by reference.

FIELD OF THE INVENTION

This present invention relates generally to utility computing in ad-hoc and configured peer-to-peer networks. More specifically, the present invention provides methods and apparatus for enabling shared program execution amongst a social network of devices by spanning the programs' control and execution threads across one or more network peers.

BACKGROUND

Conventional methods and systems for performing multiple or complex tasks include those characterized as "clustered computing" and "distributed computing[.]" Clustered computing typically involves a program host for storing various programs that define certain tasks or computations, multiple computing engines for performing the various tasks or computations, and a queue manager for assigning the various tasks or computations to the computing engines. In operation, the queue manager assigns various tasks or computations to each of the computing engines. The program host then transmits the appropriate programs, together with required inputs, to each of the computing engines. The computing engines download the programs and execute their required tasks or computations.

Similarly, distributed computing typically involves one or more controller programs running on one or more nodes of a computer network. These controller programs control the launch and operation of multiple component programs which are also running on one or more nodes of a computer network. In operation, once a distributed application is composed (i.e., component programs, communication routes between component programs, and computing nodes on which the component programs are to be run are all specified a priori), a controller program disseminates launch commands and routing information which in turn, launches the respective component programs. Once launched, the component programs run continuously and remain connected to the controller program to receive data and further instructions.

As will be appreciated by those of skill in the art, the conventional systems and methods described above each require a central controller entity (e.g., a queue manager or controller program). As a result, these systems are limited by a single point of failure. In other words, if the central controlling entity of the respective systems fails, then the entire system fails. In addition, since the above systems require the transmission and downloading of computer-executable code, the systems are susceptible to viral infection. Notably, none of the conventional systems are able to leverage resources of a peer-to-peer network without requiring a central controller, or without having to transmit and download computer-executable code.

Therefore, it would be desirable to have systems and methods for leveraging a peer-to-peer network in a manner that does not require a central controlling entity, nor the transmission and/or downloading of computer-executable code (e.g., program applications).

SUMMARY OF THE INVENTION

The present invention relates generally to methods and systems for executing a program structure by leveraging a peer-to-peer network. According to a method, a program structure comprising a plurality of program instructions is generated. Next, a first of a plurality of network peers executes a portion of the program instructions, which in turn initiates the execution of code hosted by said first network peer. The first network peer then migrates one or more of the program instructions, together with any requisite data, to at least one other of the plurality of network peers, where execution of the program structure is continued until one or more objectives of the program structure are achieved.

A system in accordance with the present invention may comprise a plurality of network peers in communication with each other, with each of the network peers comprising a memory for storing code, and a processor for executing said code. At least one of the network peers in the system comprises code that when executed, causes said first network peer to generate a program structure comprising a plurality of program instructions; execute at least a portion of the program instructions, which in turn initiates the execution of additional code hosted by said network peer; migrate one or more of the program instructions, together with any requisite data, to at least one other of the plurality of network peers; and continue to execution of one or more program instructions received from any other of the network peers.

DETAILED DESCRIPTION OF THE INVENTION

Figure 1:
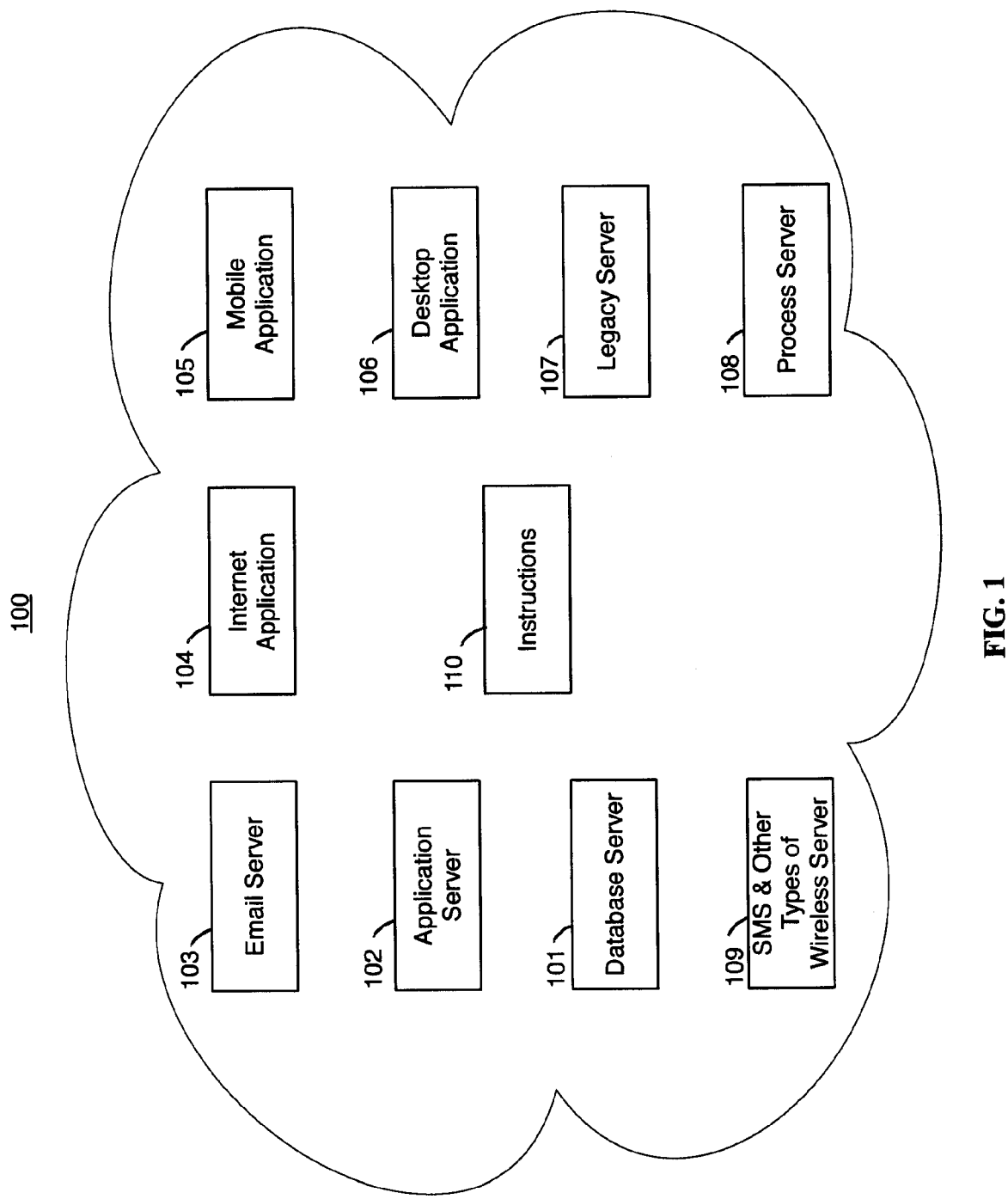
FIG. 1. shows an exemplary network configured in accordance with the present invention.

This present invention relates generally to utility computing in ad-hoc and configured peer-to-peer networks. Various embodiments of the invention provide methods and processes for utilizing ad-hoc and/or configured networks (including, without limitation, the Internet) as a type of "microprocessor" computing platform, whose processing and execution capabilities are distributed across and throughout network devices. In one aspect, the invention utilizes the Internet as an operating system that enables the creation and execution of a unique and proprietary form of distributed applications whose threads of control and execution may span one or more network devices and their respective operating systems.

Contrary to conventional software applications, whose thread of control and thread of execution remain resident within a single computing device (e.g. a copy of the software program loaded into a computer), and as a result requires deployment and execution of such applications to occur locally (i.e., within the device), the present invention provides for spanning or sharing threads of control and execution across multiple network devices, without having to transmit or download compiled code (e.g., software programs). These network devices essentially form computing social network(s) (where 'social' refers to the ability of networked devices to interact, communicate, and/or collaborate to execute program instructions and/or to perform any other computing-type tasks), and may include, without limitation, personal computers (PCs), servers, mobile phones, pagers, personal device assistants (PDAs), radio frequency identification (RFID) devices/tags, data sensors, kiosks, automatic teller machines (ATMs), wireless fidelity (WiFi) access points, routers, embedded multi-dimensional barcodes, global positioning (GPS) devices and equipment, gaming devices, multi-media devices, television/cable set-top boxes, digital still and video/audio motion cameras, security/surveillance equipment, healthcare monitoring equipment, medical imaging devices, assembly line components, and the like; and machines, equipment, hardware and devices used in business, defense operations, financial securities industries, insurance services, supply chain management, healthcare, and other similar environments, to name a few. As a result of this thread sharing, program instructions may be deployed and executed utilizing multiple devices, rather than just a single device. As can be appreciated by those in the art, distributing deployment and execution capabilities across multiple devices provides for faster and more efficient program execution, and vastly expands the overall execution capabilities of each device in the network, particularly since a first device may utilize the execution capabilities of a second device to execute its program.

As used herein, the terms "program" or "program structure" are not intended to refer to conventional software applications which consist of compiled, computer-executable code. Instead, a program or program structure is intended to represent a proprietary structure of execution instructions that may themselves initiate the execution of code (e.g., software applications) that is hosted by a particular network peer. In addition, these program instructions may be used to affect how code or other instructions are executed, and they may even be used to initiate the creation or deletion of other program instructions, or to initiate the insertion of one or more program instructions into a program structure before, during, or after the program structure has begun execution. As will be understood by those of skill in the art, a program structure (or set of program instructions) in accordance with the present invention is one level removed (i.e., higher) from that of compiled, computer-executable code. As a result, the program instructions of the present invention may be transferred amongst peers without the possibility of transferring viruses, they may be inserted or removed from a program structure after execution of the program structure has commenced, and they may initiate the execution of computer-executable code, as noted above. In addition, program instructions may be paused for any length of time and restarted, and executed across any number of network peers.

Notably, a program instruction may itself comprise one or more program structures. To illustrate, an example "program" of the present invention may include a sequence of instructions, wherein a first instruction may require a software application such as Flickr™ to execute, a second instruction may require a software application such as iTunes™ to execute, a third instruction may require an instant message application to execute, a forth instruction may comprise an entirely new program structure, and so on. As will be discussed further below, this "program" or set of instructions does not necessarily have to be carried-out by a single network device. In other words, the network device that initiates such a program need not have the capability of executing all of the various software applications called by the program (i.e., the network device need not host all the code called upon by the instructions to execute). Instead, the initiating device may leverage the capabilities of one or more of its network devices (and even on neighboring networks) to fulfil those instructions that it can not carry-out on its own.

Unlike typical distributed application programs, which simply replicate and/or transfer program applications (i.e., store and execute in its entirety) amongst multiple network devices, and which require a central controller/server to distribute/control execution of the program applications, the present invention provides for the execution of a single proprietary program structure in "pieces" or in "variants" (based on personalization and customization criteria) across various network devices without requiring a central controller or server to orchestrate the overall execution of the program structure, and without having to transfer program application (i.e., code) between devices. In other words, rather than storing the same application in multiple devices and executing that application multiple times as determined by a central controller/server, and rather than transferring a program application to multiple devices, the present invention provides for a proprietary program structure whereby each independent program instruction is executed once by a network device that hosts the appropriate code for carrying out said instruction, and whereby multiple network devices may be used to fulfill the various instructions without the need for a central controller or server, and without the need to transfer program applications. In this manner, the combined execution of all program instructions (by one or more peers in the network) will result in the complete execution of the program structure as a result of leveraging the capabilities of multiple network devices.

As a point of reference, conventional program replication may be found in today's instant messaging (IM) applications, distributed file sharing applications, traditional client-server applications such as web-servers, web-applications, email severs, back-office application servers, and the like.

It is important to note that unlike conventional systems, the utility computing functionality of the present invention may reside across one or more networks (wired and/or wireless) of communication devices (configured or ad-hoc), rather than on any one specific physical device itself. For example, in a conventional system, a web-portal is typically resident to a single server instance, executing within a thread of control within the said instance. Contrarily, in one aspect of the present invention, for example, the thread of control may be distributed and shared across a plurality of computing devices of different types, which together comprise and form the computing social network.

In an exemplary embodiment, the present invention may simply be referred to as a Business Internet Operating System, or "BIOS". It should be understood, however, that this term is not intended to limit the present invention in any way. It is merely intended to provide a shorthand way of identifying one aspect of the present invention.

Thus, in an exemplary BIOS enabled network (which includes one or more BIOS enabled network devices, and which may include one or more smaller BIOS networks), each device in the network(s) will be configured with a 'core' set of instructions that are common to all devices in that network. In addition, each network device may have its own individual instructions representing its additional functional capabilities and/or its ability to execute one or more software applications above and beyond those that are common to the network. Thus, a BIOS program may consist of a sequence of instructions in a "semantic" form, which comprise two categories: (1) the BIOS "core" instructions, which include those program instructions which may be executed on any BIOS peer; and (2) the BIOS "extensions", which consist of a semantic interface which calls upon the unique resources or computing capabilities of the various BIOS peers. For purposes of this disclosure, the term "semantic" refers to describing or presenting instructions, software, code, etc. in such a way that any recipient of the same is aware of how to interpret said instructions, software, code, etc., regardless of whether the instructions, etc. was intended to be 'compatible' with the recipient.

To execute a BIOS program (i.e., a set of instructions, including core and extensions, that comprise a subset of all instructions available), a first network device or host "peer" may begin executing the instructions until it gets to an instruction it is unable to execute, or otherwise determines that it should not execute (e.g., the program, itself may include an instruction that explicitly instructs the host peer to refrain from executing certain instructions, even if said host peer has the ability to do so). As used herein, the term "peer" or "network peer" shall refer to any network device (as that term has been defined above) that has been networked and/or configured to communicate with other peers in a computing social network that has been configured in accordance with the present invention.

Thus, once a network peer reaches an instruction it is unable to execute, or otherwise determines that one or more other peer(s) should execute one or more program instructions, that network peer may opt to send or migrate one or more of the program instructions, together with any requisite data, to one or more other network peer(s) that are capable of executing said instruction(s). Optionally, the network peer may bundle up the entire program (including instructions that have already been executed), and migrate the program, together with any requisite data, to one or more peers for continued execution. In either case, the program will continue to execute/migrate in this manner amongst the network peers until the ultimate objective(s) of the BIOS program are achieved. Notably, reaching the ultimate objective(s) of the BIOS program may or may not require all program instructions to be executed. Execution of a BIOS program in this manner may be considered a form of "distributed execution" insofar as different instructions or portions of the BIOS program are executed by different BIOS enabled devices across the BIOS network using various types and configurations of network communications. Thus, the BIOS communication network itself may function as a microprocessor backplane for the BIOS platform, with each BIOS peer (or device) in the network comprising its own native operating system and individual program execution capabilities.

Notably, this form of distributed execution does not require a central controller or server to determine or dictate which peers execute which program portions or instructions. Instead, the peers or program instructions determine which (if any) instructions are to be migrated, and which peer(s) are to receive the migrated instruction(s). For example, as noted above, a BIOS program itself may include instructions requiring the host peer (i.e., the peer on which the program is currently residing) to migrate one or more of the instructions to one or more other peers for execution. In such a scenario, the BIOS program controls the movement or distribution of the BIOS program. Alternatively, the host peer may include, as part of its core instructions, the ability to recognize instructions which it is not configured to execute. Optionally, the instructions themselves may include code that is indicative of the capabilities required for their execution. In such cases, the host peer may include inherent core instructions to query for another peer(s) in the network capable of continuing execution of the program instructions, and to migrate the program instruction(s) to said other peer(s) for execution.

The above illustration is one example of how the present invention is able to create peer-to-peer computing infrastructures for enabling shared program execution power and ability from among any number of network devices within the same or across different networks, including both server and serverless network topologies.

As noted above, the present invention utilizes a particular program structure to enable distributed execution of instructions across multiple devices of a peer-to-peer computing social network, and/or across multiple networks. To create this program structure, the present invention may make use of a proprietary programming language, hereinafter referred to as "iDNA" (Internet DNA), which enables and initiates the execution of the instructions across any number of devices or networks, and over any period of time (i.e., execution may be paused, cached, delayed, etc. for any period of time, and then resumed). Further, iDNA is such that it need not be aware of which, how many, or the location of the network devices that will ultimately execute the instructions.

As with other novel terms used throughout this disclosure, the term "iDNA" is not intended to be limiting, but rather provides a shorthand way to refer to one particular programming language that may be utilized to implement the distributed execution concepts of the present invention. It is important to note that iDNA and the various other novel concepts discussed herein are all mutually exclusive. In other words, distributed execution, for example, may be implemented independent of iDNA, and vice versa.

By way of background, the term 'iDNA' derives from the concept of creating a programming language that encompasses many of the characteristics of actual DNA. For example, just as the mechanism of molecular genetics/biology are able to insert, re-write, and/or extract certain sections of DNA from within DNA strands, network peers may insert, re-write, and/or extract certain portions of iDNA code and/or instructions from a set of program instructions in order to accomplish (i.e., complete) the entire program instruction set. For example, a classical view of DNA is composed of regions which encode specific sequences required for protein synthesis (exons), as well as regions which are not translated into proteins (introns) but which may be involved in controlling the expression of said protein encoding regions (exons). Before protein synthesis begins, the non-coding DNA regions (introns) are removed in a process called intron splicing. After said processing, the resultant messenger mRNA, which encodes the protein specified by the gene in the DNA sequence, consists only of exons. A similar approach is taken via the architecture of iDNA, insofar as iDNA contains instructions which actually execute software artifacts on a peer, as well as instructions which manipulate the execution of said instructions. The instructions which execute software artifacts on the peer are not unlike the exons of DNA. Furthermore, the semantic and structural aspects of iDNA are not unlike the introns of DNA which control the expression of protein encoding genes. It is this type of architecture which leads to the robust results of said invention.

iDNA uses semantic structures (e.g., W3C standards and extensions to the baseline RDF specification) to encapsulate existing software applications, original embedded algorithms/code, library extensions, and/or any piece of code in a manner that enables network peers to recognize the encapsulated code as an instruction, and to determine whether or not it is capable of executing said instruction. As a result, these instructions (which call upon any number of different software applications) may be discoverable, capable of being reasoned about, and ultimately executed by any number of peers in the network or from neighboring networks.

Encapsulating software applications, as described above, refers to the process of appending certain proprietary code to existing software code. This proprietary code may include, and is not limited to, additional code which calls software artifacts, as well as code which assists in discovering said software artifacts, as well as semantic representation which articulate the specifics of said software artifacts. As a result, BIOS configured devices will be able to recognize and understand what to do with the encapsulated instruction (e.g., execute or push on to next device). Encapsulating software applications in this manner allows for large scale threads of both execution and control (e.g., even Internet scale), which can be recognized and followed by any BIOS enabled computing device. As a result, users, programmers, and BIOS-type networks are able to bundle up various executable instructions in semantic form (as opposed to machine language), together with any requisite data and distribute the execution of the bundle across multiple devices (and/or networks) that are reachable via a network infrastructure. In effect, this invention may use web standards to perform fetch and execution cycles of micro and macro scale instructions and data at the addresses represented by the computing devices themselves. In the case of the Internet, this approach brings the fetch and execution cycle to the surface of the Internet, thereby achieving a virtual multi-core microprocessor architecture on a network/Internet scale.

Another aspect of iDNA is its ability to be written and/or re-written on-the-fly as the result of knowing the semantics of both common core instructions and the more unique and breadth oriented extension instructions. Specifically, starting out with an objective, specified as: a) "here is what I have" (which may include certain initial conditions characterized via artifacts, data, resources, processes, etc., and as b) "here is what I want" (which may include certain desired final conditions characterized via artifacts, data, resources, processes, transformations, new strands of iDNA, etc.), a series of graphs can be generated to reflect one or more solutions/paths for reaching said objective in a manner that considers both the initial conditions of the objective and its final conditions.

The "haves" and the "wants" are specified using semantic specifications just as the iDNA instructions are themselves specified with semantics. Thus, a graph depicting a solution/path for reaching a particular objective may comprise a series of semantically annotated instructions where the "haves" comprise the start-node of said graph, the "wants" comprise the end-node of said graph, and one or more semantically annotated instructions comprise intermediate nodes between the start and end nodes. Since the use of semantics is uniform across all nodes in a computer social network, the present invention can pose interesting questions such as, for example: Is there a trajectory from the start-node through any given number of intermediate-nodes which concludes with a complete path to the end-node? If there is (and there may be many), then that trajectory, when condensed to its symbolic form, may be considered akin to a strand of iDNA code which results in achieving said objective.

Likewise, if no trajectory exists, then the configured computing social network may not be equipped to accommodate the type of distributed computing required by said objective. This knowledge about the completeness of the computing graph aids in the runtime configuration and management of the computing social network. Complete traversal can be fully specified, which yields an a priori strand of iDNA, or it can be partial, with the details of particular sections of intermediate-nodes being determined at runtime while the trajectory is being traversed; this approach yields an a posteriori strand of iDNA.

Referring now to FIG. 1, an exemplary BIOS network 100 configured in accordance with the present invention. Included in this exemplary network 100 are a database server 101, an application server 102, an email server 103, an Internet application 104, a mobile device 105, a desktop device 106, a legacy server 107, a process server 108, and a wireless server (e.g., an SMS server) 109. The quantity and type of devices shown in this exemplary network are not intended to be limiting. To the contrary, any number or type of devices (or peers) may comprise a social network in accordance with the present invention, and multiple social networks may be connected through common devices (or peers) serving as a 'bridge' between any number of adjacent social networks. As will be appreciated by those in the art, however, the robustness of the network increases proportionally as the number and/or types of devices present in the network is increased.

Unlike conventional networks, the exemplary BIOS network 100 is able to utilize its various resources 101-109 (i.e., various network peers) to execute a particular set of instructions 110 socially. In other words, each network peer 101-109 has access to and is able to leverage the functional capabilities of the entire group (101-109). Thus, any one peer can request a particular instruction, even if that peer is itself incapable of executing said instruction. An illustrative example of this concept is described below.

Suppose a user desires some information or has some sort of request. Using his mobile device 105, the user may generate and send a text message to the network 100. The text message may include any sort of reminder, a question, a request, a command, etc. For example, the text message may read: "remind me to pick up shampoo" or "remind me to pick up my dry cleaning"; "notify me when my friends are nearby and share a similar interest"; "where is the nearest Starbucks™ to me"; "find points of interest from my local geo-path in this city"; "show me stores here which participate in my digital loyalty program"; "recommend a good Italian restaurant here in New York City that is within 5 blocks of my current location"; etc.

For purposes of this illustration, it is assumed that the user desires to locate a Starbucks™ coffee shop that is nearest to his current location, and as a result, generates and transmits a text message: "where is the nearest Starbucks™ to me" to the network 100. In order to actually respond to the request, several determinations (each requiring different hardware/software capability) must be made. First, the mobile device 105 needs to know its geo-location. If the mobile device 105 is not equipped with or does not support Global Positioning (GPS) natively, it must defer the determination of its location to some other provider (i.e., another peer in the network 100). Secondly, a parser and/or some recognition software/hardware is necessary to interpret the text message to understand what exactly the user is requesting (i.e., the user's intent).

Once the user's intent or objective has been ascertained, the user's geo-location must be associated with the business entity of "Starbucks™" and quantified with the user's intent to find the nearest Starbucks™. Fourth, the association and user's intent must be communicated to a service which can perform two-dimensional location based map services. Required are the geographical Starbucks™ map locations and/or the means whereby that information can be acquired. Fifth, once a proximity map (showing the user's location and the nearest Starbucks™) is generated, a "best route" for guiding the user from his current location to the nearest Starbucks™ must be determined, thus routing capabilities are required. That path can be returned as a text message of directions, or as a path overlaid on a map rendered through a mobile web browser on the mobile device 105, for example.

For purposes of an additional illustration, it is assumed that the user desires to be offered similar shopping or 1:1 marketing campaign experiences and/or loyalty program offers of a local context while in a remote location. In a local context, a user's ability to opt-in to local merchants 1:1 marketing campaigns establishes interest with location. In a local context, a user's geo-path (defined as a collection of spatial and temporal related geo-position samples with associated meta-data) is accumulated over a period of time, for which repeated interactions with merchants and services/solutions denote pattern(s) of increased interest and/or participation. These learned behavioral patterns can be applied even when the user is in a remote location, such that the user of said services operating on a network configured according to the present invention can benefit from services and offerings similar to those offered in the user's local context, even when the user is in a remote context (e.g., when the user is traveling). This allows global access to loyalty and brand programs that span local and remote contexts based on behavior patterns of users making use of their mobile devices as bookmarks into their behavioral interests, regardless of location.

Referring again to network 100, the various network devices 101-109 may be utilized collectively to execute the user's request. For example, database servers and/or services 101 may be accessed to retrieve store locations of various Starbucks™; application servers 102 may be utilized for its GPS triangulation capabilities; email servers 103 may be utilized for communicating information; Internet applications 104 may be used to overlay a route (from user's current location to closes Starbucks™) onto a web browser illustrating for the user how to arrive at the Starbucks™; mobile device (and application) 105 is used as a "remote control" to initiate the text message and transmit it to the network 100; desktop applications 106 comprising an online proxy may be utilized to monitor and log what its owner is doing while in a mobile real-life context; legacy servers 107 may comprise standalone applications or command line tools which may be accessed for natural language processing and/or recognition; Process and/or Workflow servers 108 may be utilized to orchestrate the flow of resources to obtain a final product—which in the example given is satisfying the user's request to find the nearest Starbucks™; SMS and other types of wireless access points 109, which connect the mobile world with the online world in contexts may be utilized to request information via simple text messaging which relies on the SMS protocols.

Ultimately, the user's simple text message is transformed into a self-realized strand of executing instructions 110 which executes across the various network devices 101-109, as discussed above. The strand 110 includes pieces of executing instructions which when performed on the respective computing devices 101-109, results in the goal being obtained for that particular segment of the strand of executing instructions.

In total, the completed path of execution may (as in the foregoing example) span multiple devices. That said, the orchestration of said execution is controlled by the strand of instructions 110 itself, and is not relegated to the control of the devices 101-109. In other words, the devices 101-109 do not control how the instructions 110 are executed, they merely provide the environment whereby the each instruction in the strand may be executed.

"Stateful" and "stateless" bifurcation within the architecture described herein are novel with respect to existing architectures. The term "stateful" is defined as the concepts and mechanisms utilized to track a set of disjoint entities as if belonging to the same group, as opposed to tracking them as separate entities in isolation. As a group, there is a concept of "whole knowledge" (i.e., knowledge which is accessible, modified and/or created by the group) which spans the collective of entities, implying that one entity may produce information that another entity may reference but at a much later date than generated. Any entity which is a part of the group has access to the "whole knowledge" of said group. This type of persistent knowledge is possible as state is maintained for and across the group of said entities.

Conversely, the term "stateless" is defined as the concepts and mechanisms utilized to track a set of disjoint entities in isolation, independent and mutual exclusive of each other. As a result, there is a lack of global and shared knowledge with respect to the other entities. This lack of global and shared knowledge allows for simpler solutions to distributed computing at large.

As noted above, one of the novel aspects disclosed herein includes the ability to distribute a thread of control and/or a thread of execution. By definition, the act of execution is the result of state over a period of time involved in the act of execution. If the act of execution that is occurring in a host peer is interrupted prior to its completion, several aspects are known: 1) the extent of execution to up until the interruption; 2) the amount of execution remaining; and 3) the state of the execution environment. These three aspects, of which there may be additional aspects, may be referred to as 'stateful' representations of different aspects required for said execution. As an option, these stateful representations may be stored in memory (or to a persistent storage representation such as a database or a serialized file, for example), such that the act of execution may be continued at a later date. Alternatively, execution may be continued by a different peer. In order to continue said execution on the different peer, these stateful representations may be conveyed from the host peer to a second peer, as which point the second peer may continue execution as if it were the original host peer. This capability is due to the benefit of a 'stateful' strand of iDNA.

It is important to note that concurrent with maintaining stateful representations of an execution session, the executing peer itself is 'stateless', as it has no internal concept of state other than what it is given by the iDNA strand, and it only knows of that state for the duration of the iDNA strand itself. Therefore, there is no context maintained from one iDNA strand to the execution of a different strand of iDNA. As a stateless peer, every iDNA strand is processed independently of any proceeding or succeeding strands of iDNA, and as a result, an asynchronous stream of iDNA strands are seen as mutual independent and exclusive of each other. Thus, the concept of 'statefulness' is relegated to the content of the iDNA strands themselves, and any relationship implied or explicitly exploited are the direct results of statefulness encapsulated within iDNA messages. It is through these methods and processes that distributed computing is made as simple and yet as robust as the actual DNA models of molecular genetics/biology.

As demonstrated by the above example, one of the novel aspects of the present invention is the ability to leverage disparate pieces of technology and/or network devices which do not necessarily "know" how to communicate with each other, and combine them to seamlessly execute a user's commands/requests. Using various network devices and technology in this manner goes well beyond the conventional web applications, which are typically client-server centric, and well beyond the single computer application, which is device centric. Indeed, executing instructions requiring various technologies requires the ability to merge different computing resources in order to use them in ways not previously considered. The network 100 of FIG. 1 and the above illustrate this novel ability of combing multiple computing devices and resources, some of which are hardware specific, others software centric, and others comprising both.

In addition, the network 100 is able to utilize its various devices to 'learn' and store certain recurring request/behaviors. This way, the system is able to anticipate certain recurring requests, and/or proposition the user to confirm. For example, referring again to the Starbucks™ example discussed above, if a user habitually purchases coffee in the morning, the network 100 may 'learn' this behavior by either analyzing recurring instructions (such as "find the nearest coffee shop"), or by recognizing (via GPS and server applications of the network, for example) that the user frequents coffee shops. Once this behavior is 'learned', the network will be able to anticipate user commands and prompt the user, rather than waiting for the user to generate a command message. For example, if the user travels to a location that is beyond the user's 'home area', the network may be used to prompt the user and ask the user (via a text message, for example) whether the user desires to learn the location of a local coffee shop, as this would be consistent with previous behaviors and/or requests and/or purchases. Alternatively, the network may simply provide the location and directions to the nearest coffee shop, without waiting for the user to confirm, something the user can 'teach' the invention to 'learn'. Thus, what results is an integration of business social networks and human social networks, where the business networks behave in a manner that is similar to humans (e.g., by learning behavior and prompting users accordingly).

As noted above, program instructions of the present invention may fall into one of two categories: "core" and "extensions". The core instructions are those that are common to all peers of a computing social network (e.g., a BIOS network). In addition to having this core set of common iDNA instructions, each peer in the social network has its own individual instructions (i.e., "extensions") representing its ability to execute one or more additional instructions (e.g., software applications) above and beyond the core instructions that are common to all peers in the network. Since these "extensions" are encapsulated using the proprietary iDNA language, other peers can read and comprehend these extensions, even if they are themselves incapable of executing the same.

The second category of instructions, or "extensions", represent unique capabilities of any specific network peer, its functionality, its I/O data types and related requirements and constraints, as well as metrics for quality of service and other similar non-executable metrics (e.g., pre-flight verification, micro and macro cost analysis, dynamic semantic and/or functional routing table modifications, realtime and optimized network topologies, etc.). The ability to recognize and ultimately utilize the individual "extensions" of each peer in the network extends the functional capabilities of each network peer. In other words, if one particular peer in a BIOS network desires to execute an instruction, but is itself incapable of executing that instruction, that peer may call upon another peer in the network with such capability to execute the instruction and return the results, or to simply continue the thread of control and/or execution. This way, each peer in the network is virtually equipped with functional abilities of the entire network. Furthermore, the particular peer may, via its non-executable metrics, control if, when, and how another peer executes the instruction, as these metrics represent constraints such as time to perform, cost to perform, priority to perform, location to perform, etc.

In a program comprising a set of core and extension instructions (e.g., BIOS program), the instructions are fetched and executed in order. Unlike conventional programs, however, one novel aspect of this invention is that the program can be self modifying in response to the execution context. For example, in a conventional web-based application program, if an external RESTful™ application program interface (API) fails to execute, an exception is caught and the program fails to achieve its final goal. In a BIOS program, for example, when an instruction fails, the BIOS program is capable of re-writing its instruction base to find an alternative by which the goal of the overall program may be achieved, albeit perhaps via a different mechanism.

Therefore, when a BIOS peer is given a strand (a portion) or a variant piece of instructions (e.g., iDNA) for execution, it will execute all instructions until it reaches the program terminal, until it reaches an instruction requiring the peer to migrate one or more program instructions, or until it encounters an instruction it can not execute. When either of the later conditions are encountered, the host BIOS peer will query the computing social network for a peer capable of executing said instruction(s). In response to the query, the host peer receives data relating to the capabilities of the responding peers. This information is stored as a record and evaluated to determine if any of the responding peers is capable of continuing execution of the instruction(s). If a peer node capable of continuing execution is identified, the one or more instructions (up to the entire BIOS program), including state and any requisite context data, is migrated from the host peer to the peer(s) offering to continue the thread of control and execution. From the perspective of the BIOS program, execution continues without interruption. However, from the perspective of the executing peer network, the actual BIOS program itself traverses between BIOS peers in order to complete its execution goals.

Unlike conventional software programs, which are designed and written to execute on a single device until said execution is completed, the program structure of the present invention is wholly unique insofar as it enables the program to migrate outside of the physical device on which said software is executing and/or initiated.

In addition, it is important to note that the program structure of the present invention contains no code, and as a result, such a program will never download code to a network peer. Thus, unlike conventional program structures, the program structure of the present invention is anti-viral. In other words, it is incapable of carrying and/or infecting host software/hardware with viruses. Thus, transference of a program instruction or program structure (e.g., an iDNA strand, for example) does not result in code being downloaded into the host computing environment. The innate benefit of the program structure of the present invention is that the software artifacts which are required to be executed by the program structure already reside on the host computing environment.

Therefore, execution may commence without the need to install anything for which the administrator of said host computing environment has not already verified, certified and approved for inclusion into said host computing environment. The program structure calls upon what is already present in the host computing environment and therefore by definition, does not encode, download, install, or otherwise introduce a foreign software artifact in order to execute the instruction(s) of said program structure.

It is noted, however, that certain core instructions will initially have to be downloaded and installed on a network device to enable said device to join the network as a first class BIOS peer, for which the administrator of said host computing environment has already verified, certified and approved for inclusion into said host computing environment. Aside from the initial device set up, the novel program structure of the present invention simply provides semantic instructions which explicitly define how to execute and act upon code that is already resident on the BIOS peer receiving the instruction(s). As a result, a BIOS program is incapable of infecting a BIOS peer, as no native code or script is ever downloaded into said BIOS peer. Each peer's particular extensions or execution capabilities are established independent of the rest of the network or peers, and not as a result of code downloaded from a distributed program. Collectively, a group of network peers comprise a set of core instructions that are common to all network peers, and certain instruction extensions which are unique to the various network peers. As a result, the peer-to-peer network forms a computing social network which provides the execution template on which a BIOS program traverses and executes according to its intent and design.

Another feature of the program structure of the present invention involves the handling of exceptions. In the case of a BIOS program, for example, if the program can not continue because the network is unable to find a peer to execute the instruction in situ, then the entire BIOS program may be recorded for later playback, or later re-execution or other exception handling mechanisms that are available. This invention is unique as it maintains both state as well as stateless memory. Preservation of stateless memory allows a BIOS program, for example, to continue execution at a later stage as the entire sum of the execution machinery is preserved. To illustrate, if a current instruction (which faulted) of a BIOS program is nested within recursive conditional statements, within looping statements, within micro and macro strands of control and execution, the entire knowledge of execution context is preserved. In conventional software, to the contrary, when code fails and an exception is captured, the programmer/user has to determine what to do, and will cease execution until the programmer/user provides a further instruction (or in cases with software at large, the program crashes). Unlike the present invention, conventional software is incapable of capturing and saving the stateless memory of the microprocessor itself (e.g. the programmer can not snapshot the physical microprocessor's state and do something with it at the meta-level of control and execution). The present invention, in sharp contrast, is capable of preserving the execution machinery when a fault occurs, allowing the BIOS peer group the meta-level control for how to resolve and continue the BIOS program execution. This also implies that state from the perspective of the BIOS program is also preserved and migrated with the BIOS programs so that when it continues, it is as if the program were always executing where it now resides.

To further illustrate the novel concepts provided herein, a BIOS program execution path may be considered akin to an a posteriori schedule insofar as the start and end goals of an iDNA-encoded program according to the present invention are known a priori, while the actual path of execution traversal, however, may be completely unknown until execution actually begins. In other words, a BIOS program will identify and execute on the requisite BIOS peers as required to achieve the goals of the BIOS program, however, until the program actually starts to execute, the next step (or network peer) along the execution path may or may not be known ahead of time. This phenomenon may be caused by any number of factors, including (without limitation): the dynamic nature of a network (i.e., peers entering and exiting), the changing execution capabilities of peers (i.e., system administrators changing the services offered by a host environment), the volatility of network traffic/congestion (i.e., cell phones losing connection, etc.), the intrinsic nature of the network substrate on which BIOS programs execute, or any number of other factors.

One common reason for the unpredictability of the execution path is the dynamic nature of a network. Since the utility computing techniques of the present invention are adaptable to work in any type of network environment or configuration (i.e., networks having any number of fixed and/or ad-hoc network topologies), it is not uncommon for different BIOS peers to continually come into and/or exit the network (e.g., RFID devices, mobile devices, etc.). As a result, the networks execution capabilities are constantly changing. Indeed, as new peers enter the computing social network with new extension(s), the execution capability of the social network may be expanded. Similarly, new peers may enter the network having extensions already existing in the network, thereby adding scale and robustness to the peer group which could be helpful for managing load and demand (e.g., track and trace). In this regard, the present invention provides a network level virtual multi-core microprocessor (the computing social network) that can grow and scale according to business need and runtime, real-time constraints, and environmental conditions. In addition, the present invention provides the ability to scale and execute both at the instruction level and also at the meta-level where instructions themselves can be seen as an encapsulated instruction to be executed elsewhere within the peer group or to be post processed for fine tuning or performance evaluation (e.g., pattern detection/analysis, path detection/analysis, etc.), for example.

In another aspect of the present invention, the execution path(s) by which an iDNA encapsulated program may be executed (across multiple network devices) may be chosen ahead of time according to previously defined routing tables held resident in each network peer, or they may be suggested by the entire meta-level knowledge of the peer group during real-time query and discovery updates within the plurality of known peer-to-peer computing social networks. This results in a computing/execution environment which is dynamic insofar as it adapts to reflect the constantly changing network topology, thereby providing preferred path(s) of execution.

In order to create a utility computing program in accordance with the present invention (e.g., a BIOS program or a strand of iDNA), a software toolkit (e.g., "BIOS SDK") may be utilized to generate an instruction wrappers for each new extension to be added to the program instruction core. To promote software reusability, this software toolkit may also be employed to facilitate the manual and/or automated generation of such programs from preexisting portions of program instructions (singular, micro or macro). For example, a programmer could use the BIOS SDK to query BIOS peers for the existence of a BIOS instruction meeting certain semantic requirements. Moreover, by providing a meta-level semantic description of the desired functionality of an entire BIOS program (a priori knowledge of input set of data and desired output set of results), a user and/or the peer group itself could invoke an automated network search across BIOS peers for potential candidate sequences of existing BIOS instructions (i.e., entire BIOS programs) that would satisfy the requirements of that meta-level semantic description.

As alluded to above, the present invention provides a novel approach to handling threads of execution and threads of control. Indeed, the present invention fundamentally changes how threading, not just parallel threads, but individual threads may split/merge and/or rewrite itself, depending on the capabilities of a current peer group (i.e., peer-to-peer network) as described above. Thread of control and thread of execution is itself a tangible state that can be manipulated.

Figure 2:
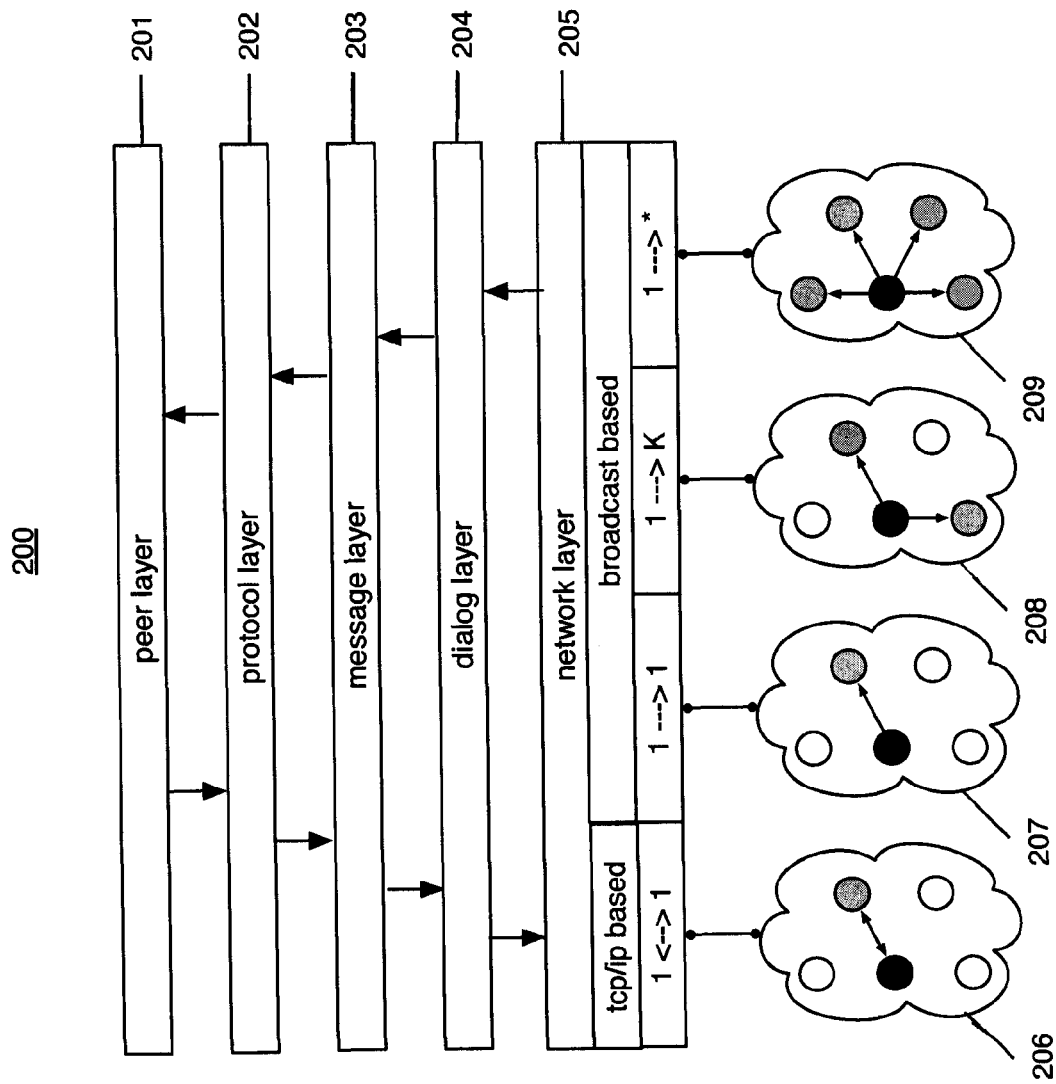
FIG. 2. shows an exemplary computing or network peer configured in accordance with the present invention.

Turning now to FIG. 2, an exemplary computing or network device 200 configured in accordance with the present invention is shown. The exemplary computing device 200 may include multiple layers, including, without limitation, a peer layer 201, a protocol layer 202, a message layer 203, a dialog layer 204, a network layer 205, and/or others. The exemplary device 200, once networked with other similar devices, may become a network peer of a computing social network configured in accordance with the present invention.

Beginning with the first layer of the network device 200, the peer layer 201 is where functionality that is unique to the device 200 (i.e., "extensions") is hosted. In other words, peer layer 201 hosts functionality/capabilities that differentiate one peer from other peers. As noted above, each peer in a peer group comprises a set of common or "core" instructions (or functional capabilities). These core instructions enable peers within the group to communicate with one another. By adding extensions (or additional functionalities), each peer extends the functional capabilities of the entire group, since each peer may call upon the functional capabilities of any other peer in the group, as demonstrated above. These additional capabilities or extensions (which go beyond the core instructions) are hosted in the peer layer 201. As described above, these extensions or extended functionality may take the form of any piece of software which can be semantically described (as that term has been defined above), and therefore executed across a collection of peers, including but not limited to software artifacts such as algorithms, libraries of compiled code or web services.

In the case where iDNA is being utilized, the peer layer 201 is wholly responsible for the interpretation and execution of iDNA program instructions. The peer layer 201 will execute all of the program instructions it is equipped to execute, and provide the results to the protocol layer 202.

Aside from receiving execution results from the peer layer 201, the protocol layer 202 host the peer's "core instructions", or functional capabilities that are common amongst all peers in a peer group. These common or core instructions enable peers to communicate, discover, query, etc. with each other. In the case where the peer layer 201 is incapable of executing an entire set of program instructions, the protocol layer 202 is responsible for taking the results and the unexecuted instructions from the peer layer 201 and passing or forwarding them onward as broadcasted peer dialog to one or more other peers in the peer group.

The protocol layer 202 is also what enables network devices configured as device 200 to interact with one another socially, similar to the way humans interact socially. This layer 202 enables the peers in a peer group to be tied together via one or more specific types of interdependencies, such as peer group execution, administration, search and discovery, security and privacy heuristics, for example. Thus, as a result of its ability to communicate with other similarly configured devices, device 200 is able to form and engage in social network activities.

To illustrate, if network device 200 were a part of a computing social network and received a particular set of instructions, but was unable to complete all of the instructions, the protocol layer 202 would look to the device's 200 network peers to determine whether any of them were able to continue to execute the instructions. Once a suitable peer is identified, the instructions are bundled (and/or re-written via inserting, changing, or extracting code, for example) and sent to the peer for execution. When execution is completed (or continued), that peer may return the results to network device 200. This type of interaction is akin to how humans interact socially. Thus, such interaction between peers is considered 'social' activity.

To further illustrate, suppose peer 200 received a set of instructions, say "execute A, followed by B, then C", but upon execution of the instructions, peer 200 fails on B. protocol layer 202 (in conjunction with the peer layer 201) may determine that a nearby peer, say peer X is capable (and willing) to execute B. Layer 202 then rewrites a portion of the original instruction set to include new codes to instruct peer layer 201 to zip up the original set of instructions, together with the new codes inserted by protocol layer 202, and send to peer X for continued execution. The new codes may also include instructions for peer X to execute B, rebundle the instruction set (with the execution results), and return to peer 200. Peer layer 201 will then execute the new instruction set (with code insertions) and protocol layer 202 will forward the bundle onto peer X for continued execution. Once executed, peer X returns the bundle back to peer 200, where C is executed.

It is important to note that the interactions between peers in a group are much different and more sophisticated than peers in a peer-to-peer network. Indeed, in a conventional peer-to-peer network, peers interact on a 1:1 basis (e.g., file sharing, music streaming, VoIP, etc.). Social peers, such as peer 200, for example, may interact on an n:m basis, such as by collectively executing a set of program instructions, as discussed above.

Below the protocol layer 202 is the message layer 203. The message layer 203 enables actual dialog between peer 200 and other peers to occur. The message layer 203 abstracts from the protocol layer 202 the details required to send/receive messages between peers within a peer group. The message layer 203 provides a uniform representation for dialog in a computing social context whereby peers can communicate among each other across bi-directional links, or whereby peers can 'tell' each other of specific events which require only uni-directional links. The message layer 203 hides the specifics and details for constructing the proper message semantics from all upper layers, thereby exposing only the tell (uni-directional) or talk (bi-directional) dialog. Talking dialogues may include, but are not limited to "handshaking" messages between two peers used to create a symmetric encryption key, to dialog for moving content from one peer's memory to another peer's memory. Tell dialog may include, but is not limited to, a message from one peer to a group of peers to notify them that a new peer has entered the current social network instantiation as well as its unique semantic capabilities, and a simple login and logout sequence which lead to the creation or destruction of a talking channel.

The dialog layer 204 is where actual messages are made across physical network stack protocols. The dialog layer 204 abstracts from the message layer 203 the details required to read and write messages across the network backbone.

Network layer 205 is the means by which connections are made between two peers. That is, network layer 205 is responsible for the specifics of how each peer instance is physically connected to and communicating with any other peer instances (e.g., TCP/IP, UDP, HTTP, FTP, etc.) Network layer 205 also handles exceptions which occur between networked devices. In addition, the network layer 205 abstracts a network stack such that fully configured networks (TCP/IP, for example) operate the same as ad-hoc networks (UDP Multicast, for example). This abstraction provides the ability to create computing social networks in lieu of a physical network connection as traditional with physical or wireless protocols utilizing the TCP/IP protocol stack. In other words, devices can communicate without the presence of the Internet utilizing their intrinsic radio capabilities, for example.

Items 206-209 in FIG. 2 represent various connections to various network topologies which network layer 205 may use to connect peer 200 to one or more other peers for 1:1 bi-directional communications, 1:1 uni-directional communications, 1:k (one to a sub-set of all peers in the network) communications, and/or 1:all communications.

In one example, network layer 205 may connect to a network topology 206 comprising two peers in bi-directional communication, using some variant of network stack built upon the TCP/IP stack protocol, for example, including but not limited to HTTP, SSH, FTP, etc.

Network 207 represents a cloud structure of a network topology of two peers in uni-directional communication using some variant of network stack built upon the TCP/IP stack protocol, UDP UNICAST stack protocol, or other viable protocol, for example.

Network 208 refers to the cloud structure of a network topology of one peer in uni-directional communication with more than one other peer grouped together as a collection of communication peers known to the originator of the broadcasted message using some variant of network stack built upon the TCP/IP stack protocol, UDP UNICAST stack protocol, or other acceptable protocol.

Network 209 refers to the cloud structure of a network topology of one peer in uni-directional communication with all other peers in the same peer cloud using some variant of network stack built upon the TCP/IP stack protocol, UDP MULTICAST stack protocol, or any other viable protocol.

In another example, peer 200 may be connected to multiple peers in multiple network topologies at the same time (not shown).

Figure 3:
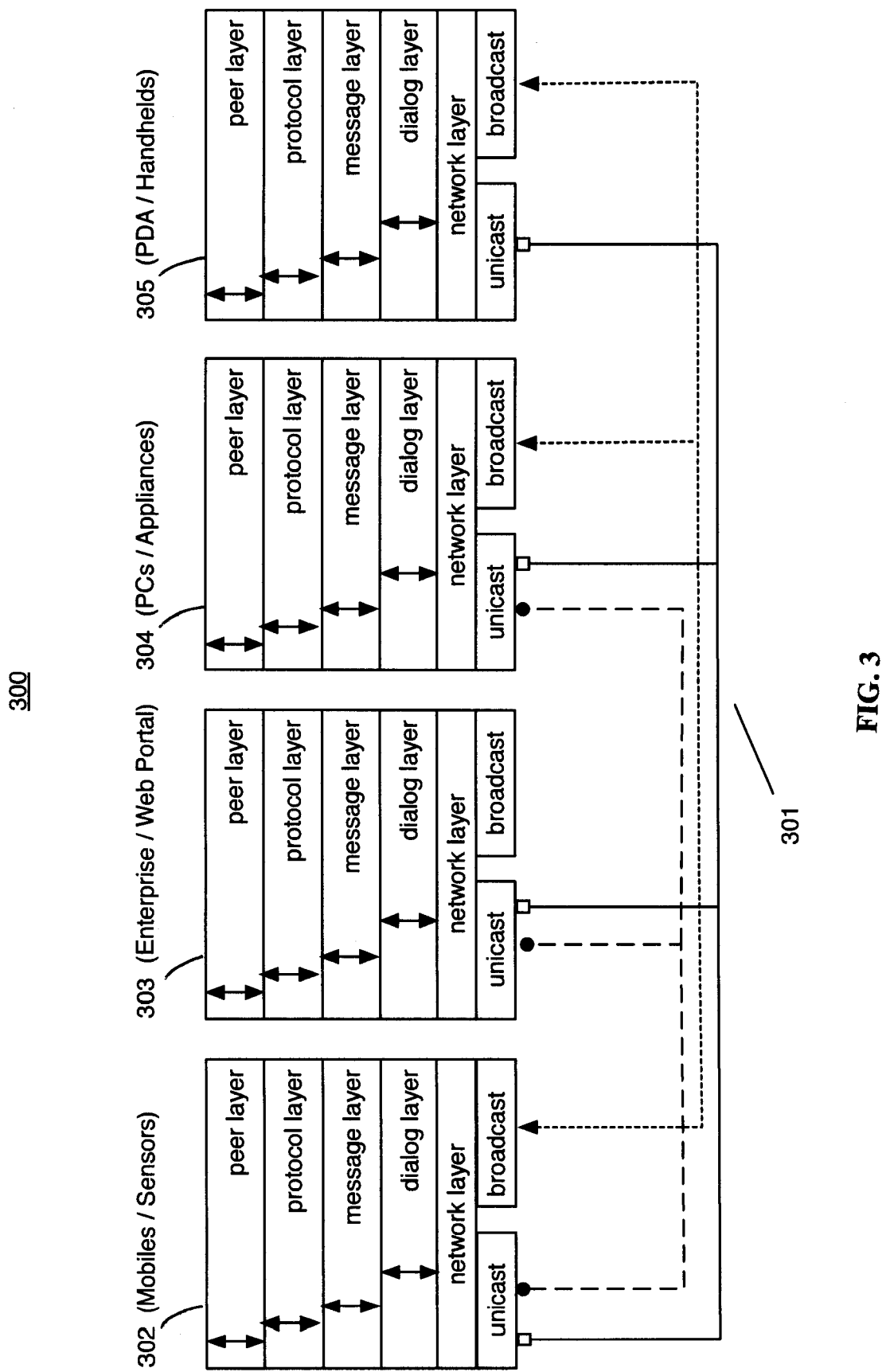
FIG. 3. shows an exemplary ad-hoc social network of collaborative peers configured in accordance with the present invention.

Turning now to FIG. 3, an exemplary ad-hoc social network 300 of collaborative peers 302-305 is shown. In accordance with the present invention, the peers (302-305) may be connected via both wired or wireless network connections 301. Further each peer may be connected to one or more of the other peers such that uni-directional, bi-directional, and/or multicast communications are possible.

The peers (302-305) of the ad-hoc computing social network 300 may comprise mobile phones, data/image sensors, printers (302), enterprise/web portals (303), personal computers (PCs), appliances, multimedia devices (304), hand held devices, personal data assistances (PDAs) (305), and any other computing/communication device. It should be noted that the peers of the exemplary network are not intended to be limiting. To the contrary, networks configured in accordance with the present invention may comprise any number and type of device capable of 'computing', where 'computing' may include, but is not limited to, the ability to execute instructions (e.g., contain a microprocessor), collect/process data, transmit/receive information, communicate with other devices, broadcast a signal (e.g., data mites), function as an identifier (e.g., RFID/tags), display/present information (e.g., table-top displays, advertisement billboards), static sources of data and information (e.g., barcodes, 2D barcodes, dynamic digital analog barcodes), etc.

It is important to note that each of the peers (302-305) of the exemplary network 300 illustrate the common architectural layers of the present invention, including, without limitation, the ability of each peer to: (a) connect to either a wired and/or wireless network connection based on the environment in which a computing device is found; (b) transfer and route conversational messages which frequently move between computing devices configured as peers; (c) communicate via a common protocol by which the computing devices are able to engage in utility (social) execution; (d) engage in specialized conversations through the advertisement of specialized instructions which allow peers to participate in different conversations based on domain specialization. Further, peers configured in accordance with the present invention are able to participate in both configured and ad-hoc network environments achieving distributed computing or execution across multiple configurations of different device allocations.

Aside from the exemplary configuration illustrated in FIG. 3, peers configured in accordance with the present convention may comprise various other types of networks. For example, a set of mobile communication devices configured in accordance with the present invention may be present in a college stadium. If the stadium has no wireless access point and/or EDGE/3G/etc. connections, nor any (or limited) Internet connections, the mobile communication devices may still be able to form a proximal network. Since the devices each comprise proximal networking capabilities (inherent in their respective architectures of supporting/hosting radio broadcasting hardware), a proximal network may be formed "on the fly" (i.e., ad-hoc). As a result, the mobile devices can begin to communicate, execute, and/or collaborate socially.

The foregoing example illustrates the concept of a 'proximity network'. As illustrated above, proximity networks do not require access to access points or to conventional Internet connection. Instead, devises create ad-hoc networks using their inherent radio capabilities. Aside from the campus stadium example provided above, this type of proximity network may be used for instances where communications are vital, but where conventional wireless connections are unavailable, such as in war situations or in disaster (e.g., natural disasters such as hurricanes, flooding, etc.) environments.

Another possible network configuration may include a set of mobile communication devices in a city street environment with wireless access point(s) and/or EDGE/3G/etc. connections. In the instant configuration, it is assumed that the mobile devices are aware of their respective locations (via, GPS, for example) and are able to find stores which match the interest and buying behaviors of the owners of said devices. Optionally, the devices may also be able to identify/locate coupons that may be usable in particular stores, and/or track purchases associated with dynamic loyalty programs. In such a scenario, the network configuration may be characterized as a mixed environment comprised of the mobile communication devices discussed above, and fixed hardware, application servers, and GPS based servers for providing the aforementioned functionality (i.e., finding stores of interest, identifying device location, finding coupons, tracking purchases, etc.). Members of this type of network may opt-in, as opposed to have coupons and other advertisements 'pushed' to them as SPAM, for example. This way, members are able to limit and control which (if any) coupons or loyalty programs they are associated with.

In yet another scenario, a network configuration may comprise a set of fixed servers and specialized RFID-capable hardware such that manufactured products equipped and associated with RFID tags can be tracked and monitored throughout said product's distribution lifecycle, from manufacturing beginning to end user purchase, across disparate non-homogenous computing environments, and within distribution systems for which temporal and spatial disconnects are frequent and unpredictable. In such a scenario, said network configuration provides for distributed monitoring and tracking utilizing the fixed servers and specialized sensor hardware.

The foregoing are just a few of the limitless examples of how devices and networks set up in accordance with the present invention could be used to engage in 'social' type computing activity and as a result, collaborate to solve very complex problems, requests, and/or instructions in a manner that is very similar to the way humans interact and collaborate.

Figure 4:
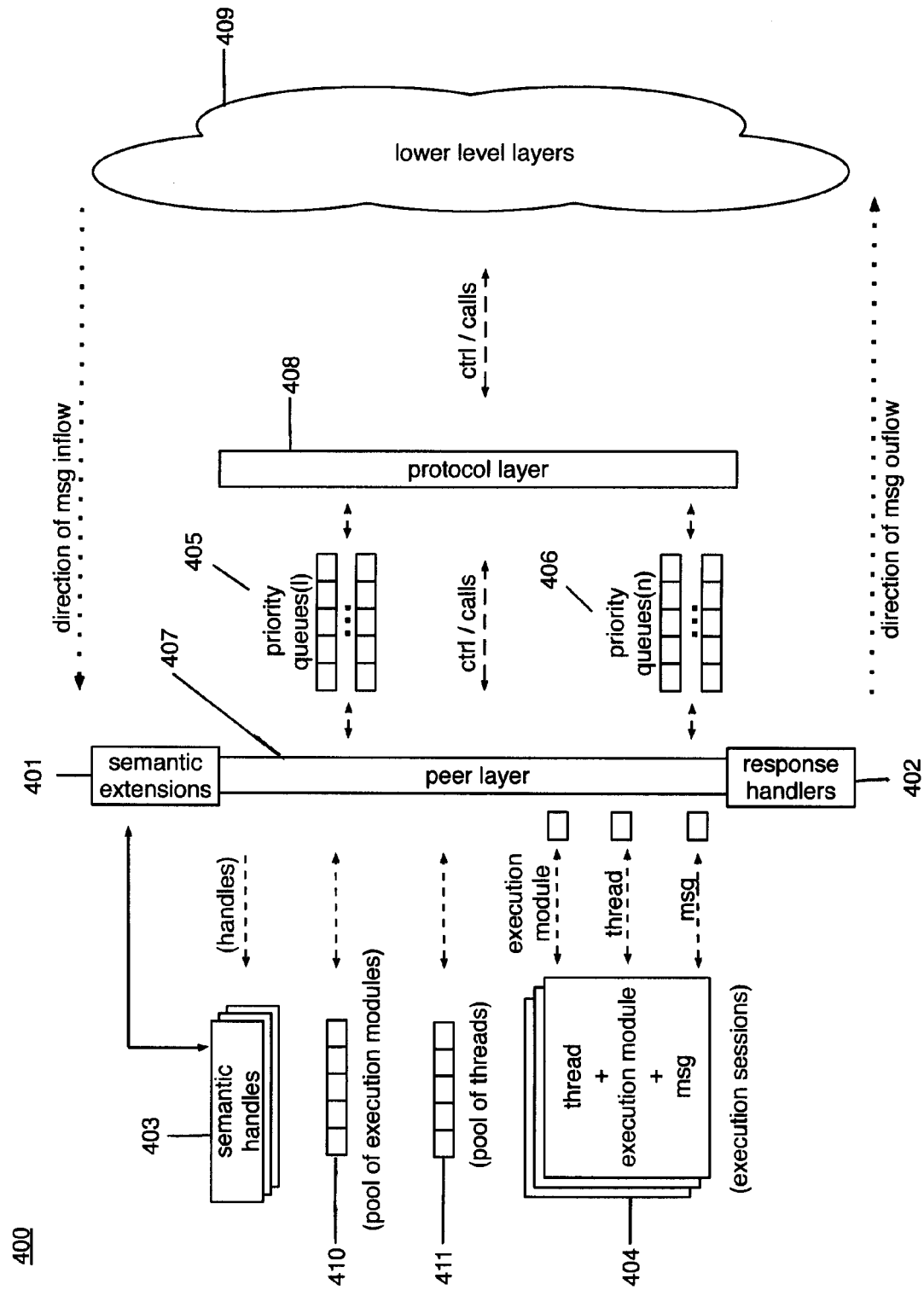
FIG. 4. shows a basic execution model of the peer and protocol layers of an exemplary computing peer configured in accordance with the present invention.

Turning now to FIG. 4, an exemplary execution model 400 of the peer and protocol layers 407, 408 of a computing peer configured in accordance with the present invention is shown. The exemplary execution model 400 illustrates that there is data and/or control flow between the peer layer 407 and protocol layer 408 via "ctrl/calls" linkages. Also shown is the overall direction of flow—messages (e.g., program instructions) to be acted upon by the said peer (i.e., inflow of messages) flow up from the lower level layers 409 (e.g., message layer, dialog layer, etc.) and messages that have been executed or acted upon (i.e., outflow messages) flow downward through the lower level layers 409.

Included as part of the peer layer 407 is a semantic extensions module 401. This module 401 is the portion of the peer layer 407 which is used to describe or characterize those functional capabilities which distinguish or differentiate one peer's capabilities from another's. Thus, semantic extensions are the descriptions or code added to particular utilities, software applications, etc. to make them readable as instructions by other peers, including those peers that do not themselves comprise the same utility, software application, etc. Examples of semantic extensions held in the extensions module 401 may include, but are not limited to, compiled code libraries, interpreted scripting languages, database engines, web invoked service invocations, hardware specific registers and ports, etc.

As noted above, all computing peers within a peer group configured in according to the present invention will be able to support and execute a common set of core codes or instructions. In order to provide uniqueness to each peer within the group, thereby increasing the overall utility and functional capabilities of the entire group, one or more peers in the group are preferably equipped with one or more additional capabilities so that other peers in the group are able to exploit these additional capabilities through semantics.

The peer layer 407 also includes response handlers 402. Response handlers 402 are responsible for enabling one peer to communicate, via semantics, the execution results of a particular instruction/program to other peers that do not necessarily comprise the ability to execute said instruction/program on their own.

Semantics, as noted earlier, are what enables different peers to communicate and engage in 'conversations' (that include exchanging execution results) via a 'common language'. These conversations may consist of sequences of both common semantics (i.e., semantics shared by all members of a social network) as well as unique semantics (i.e., semantics that are not necessarily included in all peer members, but included in at least one peer member). The response handlers 402 provide the means to communicate the results of unique semantics (which may include execution results) to other peers. To illustrate, if one peer is capable of executing a particular imaging instruction, response handlers enable that peer to execute the imaging instruction and communicate the result of said execution to another peer that is itself incapable of executing (or even understanding) the imaging instruction.

In addition to processing execution results that have been successfully completed (as in the example provided above), the response handlers 402 process four additional execution results: 1) the instruction(s) was executed and it "failed"; 2) the instruction(s) was executed and it requests to be "routed" to a known peer; 3) the instruction(s) was executed up until the current instruction and therefore requests that the sequence of instructions be "forwarded" to a peer which can continue; 4) the instruction(s) execution was interrupted due to, for example, an expiration of a lease to execute on a peer for a fixed period, or an expiration of a lease granting access to critical or expensive resources, or expiration of a TTL grant (time to live guarantee). In this sense, response handlers are responsive to certain trigger points within the code itself. Therefore, even if something happens during execution of an instruction set, the handlers 402 will be able to continue to process said instruction set.

For instance, when an instruction has been executed and is "done", the response handlers 402 could perform (among other actions) the following: 1) insert the instruction results into a database of completed instruction results for post processing, at which point a peer group can be restructured to achieve better performance in both execution time as well as network bandwidth; and 2) send a notification to inform one or more peers that the instruction(s) have been successfully completed. In addition, the response handlers 402 could actually create a new instruction(s) and insert it back into the peer layers 407 for execution.

When the execution of an instruction has failed execution, a notification may be sent to the peer or peer group informing them that something out of the normal has occurred. This may be accomplished by the response handlers 402 creating a specific instruction and re-inserting back into the peer layer 407 for execution.

When a particular instruction set is to be routed, this is indicative that the host peer has encountered a common core instruction within the instruction set which instructs the host peer to stop execution and to route the instruction set (as currently executed) to a known (or identified) peer for continued processing. There may be at least two outcomes of such an instruction: 1) the destination peer is indeed valid (i.e., exists in the host peer's group), at which point the execution session (i.e., the execution state, the instructions (including any new, modified, and/or extracted instructions), and/or execution results) is routed it to the known peer; or 2) the destination peer is unavailable, at which point the instruction session (and any execution results achieved prior to the routing instruction) is stored for routing at a later processing/execution. In the latter case, a periodic check may be initiated to determine when the destination peer becomes available (e.g. a push model) or the destination peer can query the host peer when it comes online and joins the peer group for any stored instructions destined for it (e.g. a pull model).

When a host peer, in the course of executing an instruction set, encounters an instruction which it does not understand or can not execute, the instruction set (at its current state) is forwarded. When this forwarding occurs, the response handlers 402 have a several options: 1) they can attempt to find a candidate peer which can continue execution (e.g., via meta-data stored in the instructions); 2) store-and-forward the instruction set at a later date; 3) fail after several attempts; etc.

If the instruction set has to be routed or forwarded, as explained above, the instruction set may be modified to represent the current state of execution of the instruction set, whose results may be the queued via out-flow message dialog across the message priority queues 406. The actual execution of the instruction set occurs though an instance of the execution session 404.

Semantic handles 403 refers to the individually wrapped software 'artifacts' which are separate from the actual computing peer, but nonetheless are accessible and capable of being acted upon by the host peer. Software artifacts may come from a variety of sources: 1) command line executables, which are relegated to the world of the host operating system and software written for that environment (e.g., GIMP for image processing, DOS commands, Unix commands, shell scripts, W3C command line web queries, etc.); 2) code libraries written by other software developers for which there is a known application program interface (API) (e.g., MySQL databases, Exchange servers, Mail servers, etc.); 3) communication APIs (e.g., FaceBook RESTful™ API, HTTP post/get, etc.); 4) driver APIs to specific hardware (e.g., GSM hardware across port COM1, register settings for a dedicated air quality detection sensor, etc.). Each of these software artifacts has a specific format which is required in order to be called and acted upon. As noted above, peers configured in accordance with the present invention are able to describe these different software artifacts in a uniform way. Once described in a uniform way, there is another subset of the code which can take these descriptions and write the necessary code to wrap them into an instruction format that is readable by other peers. Thus, semantic handles 403 are the code that is generated to 'wrap' software artifacts such that they will be readable as instructions by other peers.

Item 404 represents an execution session, wherein dialog messages (or instruction(s)) from the in-flow message priority queues 405 are paired with individual instances of an execution module taken from a pool of execution modules 410. The message and execution module are then combined with a thread from a pool of threads 411, and the combination initiates an execution session 404, wherein the execution module executes the message according to the thread of execution. In certain scenarios, in-flow messages may be executed serially (i.e., one after the other). In other scenarios, messages may be executed in parallel, each utilizing an individual execution module instance, an individual execution thread, and an individual execution session.

The execution of these messages (or sequences of instructions) may be considered a realization of 'conversation' from one peer to another, where the nature of the conversation is the direct result of a sequence of common and specialized codes within a set of instructions.

Once an in-flow message has been executed, the execution session 404 ends, the execution module instance and thread are each released back into their respective pools (410, 411), and the executed message (now an out-flow message) is queued in the outflow prior queues 406.

It is important to note that higher priority conversations are executed before lower priority messages, as enforced by the priority messages queues 405. It is also important to note that conversations between peers are independent and mutually exclusive with respect to each other (i.e., strands of instructions are 'stateless' with respect to each other). Order or implicit linkage between conversations is managed by the message and dialog layers of a peer. The instant execution model 400 design provides for scalability in performance, response throughput as well as over-all real-time liveliness.

The in-flow messages (from external peers, for example) are queued according to priority via priority queues 405. The peer layer 407 iterates across the said queues 405 in priority order, associating said messages with available execution module instances 404. The determination of any message's priority is determined by the message layer (not shown), which separates any instructions from the actual peer message which is communicated between peers and places the extracted instruction into the appropriate priority queue 405.

The out-flow of messages are also queued based on priority via priority queues 406. Outflow messages derive from the response handlers 402 which are addressing the disposition of any instruction which have been processed post-execution. These outgoing messages comprise the 'done', 'failed', 'route', 'forward', 'interrupted' execution status, and their destination, which is dependent on the execution status itself. For example, a message having a 'route' status will have a destination of a known peer, a message having a 'forward' status will have a token to the failed instruction to which a destination peer is able (and willing) to continue processing the current instruction set, and so on. The priority of any out-flow message is determined by the peer layer 407, which removes the outflow message from the execution environment 404 and places it into the appropriate priority queue 406. The message layer (not shown) iterates across the said outflow queues 406 in priority order, creating appropriate outbound peer messages to be communicated with the dialog layer (not shown).

It is important to note that the message layer (not shown) isolates the peer layer 407 from knowing the specifics of sending and receiving messages across the dialog layer (not shown) as well as from the format of the said message format. As a result, each layer need only be concerned with its particular responsibilities. As can be appreciated by those in the art, this layering of responsibilities provides for robust system design.

Figure 5:
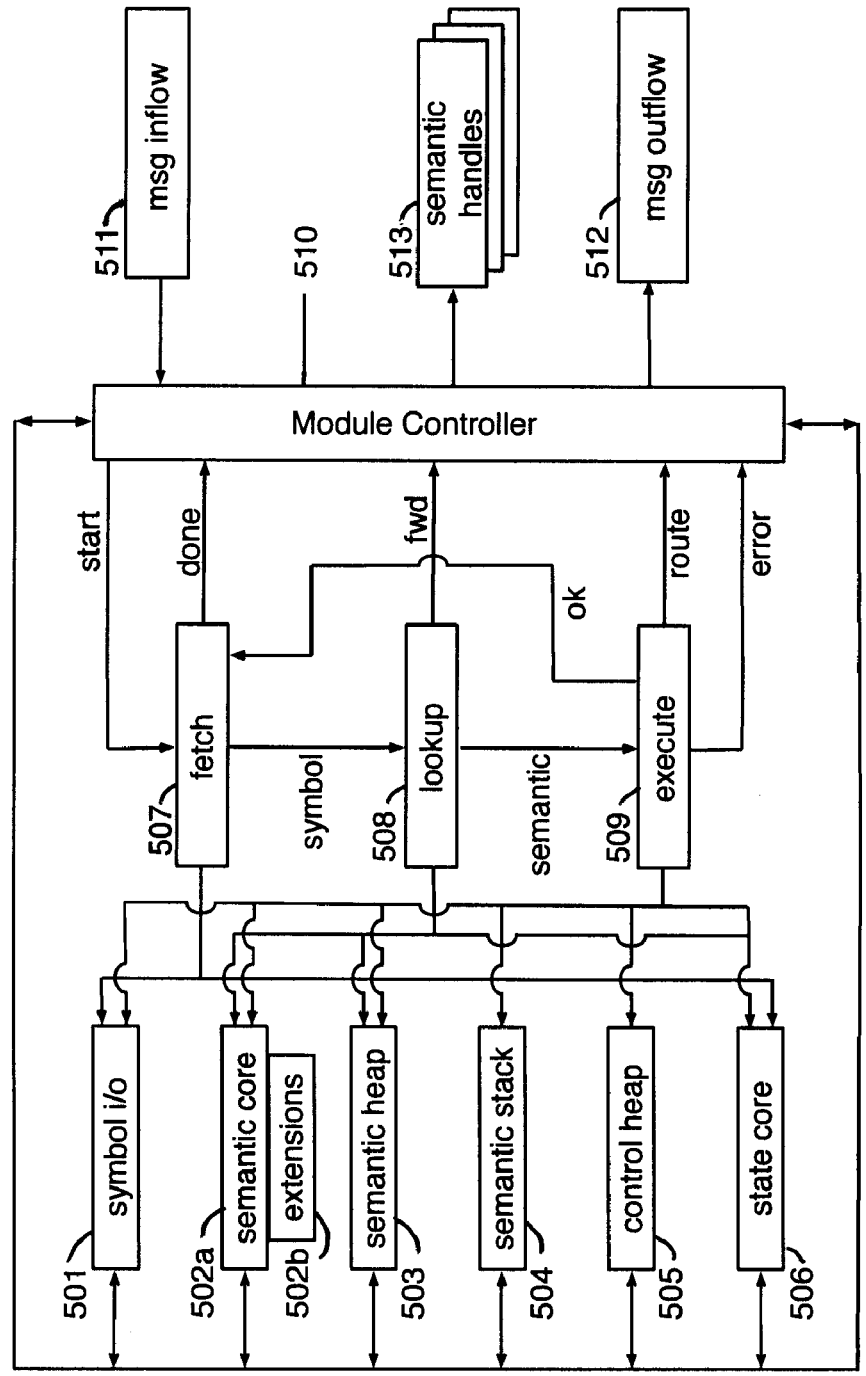
FIG. 5. shows a basic structure of an execution module of an exemplary computing peer configured in accordance with the present invention.

Turning now to FIG. 5, a basic structure of an execution module 500 of an exemplary computing peer is shown. For the avoidance of doubt, the following terms shall be given the following meanings: 1) a "message" comprises sequence(s) and the meta-level which articulates to what the message pertains and/or applies; 2) a "sequence" comprises instruction(s) and the meta-level which articulates to what the sequence pertains and/or applies; 3) an instruction describes exactly what is to be executed; and 4) a "symbol" is a symbolic representation of an instruction. These terms may also be expressed as follows:

> Message=1{Sequence[meta-data]}*–message is 1 to many sequences;
>
> Sequence=1{Symbol[meta-data]}*–sequence is 1 to many symbols;
>
> Symbol=symbolic id of an Instruction; and
>
> Instruction={execution, requirements, results, meta-data, etc.}

Instructions know what it is they are to do, their execution profile, their requirements, their results produced and any of the meta-data which semantically addresses the nature of an instruction, where nature is defined as any and all aspects which represent a fine or coarse grained software artifact and/or thread of control and/or execution. Symbols can be anything, including but not limiting to a series of colors in an image patch work mosaic, a two dimension multi-sequence barcode of sorts, a series of alphanumeric characters, a series of binary codes, etc. For example, symbols may take the form of certain colors and/or multi-dimensional pattern combinations of color in an image, such that the image itself, when processed, contains the sequences of instructions to be executed. In this manner, a properly encoded image can contain the instructions required to process it for an on-the-spot loyalty program coupon, for example.

Turning again to FIG. 5, a basic structure of an exemplary execution module instance 500 of a computing peer configured in accordance with the present invention is shown. The exemplary execution module 500 exemplifies an actual executable conversation between peers within a computing social network in accordance with the present invention. The exemplary execution module 500 comprises a symbol I/O parser 501, a set of common core semantic instructions for code mapping 502a, a set of semantic extension instructions for mapping to specific semantic handles 502b, a semantic heap for storing meta-level semantics defined by a sequence of said semantics 503, a semantic stack for storing semantics which are acted upon and/or created by semantic codes/instructions 504, a control heap for storing meta-level structures which control sequences of semantic symbols as a group upon which meta-level logics can be applied 505, a representation of the state of the execution module 506, a unit to fetch message/command symbols 507, a unit to perform a lookup of a symbol resulting in an executable semantic 508, and a unit to execute the said semantic 509. The architecture of the exemplary execution module 500 is unique and different from conventional stack-based hardware micro-processors, particularly with respect to the extensibility of both the instruction core and the data types.

The symbol I/O 501 refers to the unit in the module 500 responsible for the loading of a conversation message into an I/O stream through which both read and write access of individual symbols within said message can occur. The symbol I/O unit 501 parses the message to identify its symbols, which may then be looked up in the semantic core/extension instruction sets (502a, 502b). At that point, the symbols are resolved to a particular handle, that handle is then able to manipulate entries of an execution data stack. Collectively, the symbols are akin to a string representation of the common core instructions and the non-common extension instructions. Ultimately, the symbols represent a symbolic name by which a software handle may be called upon to execute its runtime behavior. Further, since semantics are actionable entities inside a hosting computing peer, message sequences contain symbols which map to the corresponding semantic handles, providing a compressed representation. Furthermore, a symbolic representation permits operations such as, but not limited to, pre-flight verification, sanity based verification, cost and performance pre-analysis, etc.

As noted above, the semantic core/extension instruction sets (502a, 502b) refer to the units in the module 500 responsible for providing the translation/mapping of message symbols with actual semantics to be executed. As previously discussed, the message symbols may comprise: 1) common core semantics; and 2) semantic extensions. Semantic extensions relate to those functional capabilities that are unique to a particular peer, and which differentiate it from other peers, for example. These semantic extensions may include, but are not limited to, compiled code libraries, interpreted scripting languages, database engines, web invoked service invocations, etc. Further, these semantic extensions may include RFID hardware devices, multiple-dimensioned barcodes, data sensor swarms or any other hardware device accessible via a hardware interface.

The semantic heap unit 503 refers to the unit in the exemplary execution module 500 responsible for storing meta-level semantics defined by a sequence of said semantics. Meta-level semantics are a logical grouping of a sequence of message symbols which are referenced as a singular group. These meta-level semantics are similar to a procedure or a block or a lambda expression in traditional programming languages. However, unlike with conventional programming languages, the present invention allows for the re-writing of both the individual symbols and/or entire meta-level sequences.

In accordance with the present invention, sequences can grow and shrink in accordance to their particular objective, which can change from time to time as a result of certain events. For instance, if a particular message includes a sequence of instructions which a particular peer is unable to execute, the execution module of said peer may insert new instructions into the original message to enable the remaining instructions to be executed. In such an example, the newly inserted instruction may require the bundling of the entire message session (which would include the executed portion of the message and the remaining unexecuted portions thereof), forwarding or routing the bundle to a neighboring peer to continue execution of the message instructions, and returning the results (with the bundle) once execution is completed. As a result, the execution module is able to perpetuate the execution of the entire message, even if it may not (or is unable) to execute all of the message instructions itself. In essence, the execution module is "re-writing" the message on the fly in order to ensure that all of the instructions are executed. Notably, the execution module may insert other instructions, such as to erase previously inserted instructions, to optimize the continued execution of the message instructions. This ability to write and insert instructions into existing programs structures is one of the very many features disclosed herein that distinguish the present invention from the rest of the art.

As illustrated above, changes to instruction sequences may include the addition of code, the removal of code, and/or a modification of code. Examples of why sequence-changes may be necessary include, but are not limited to, changes in a network, failure of a peer to execute a particular instruction, user preferences, user customizations, etc. Although similar in filtering capabilities to the symbol I/O unit 502, the semantics heap 503 further understands the meaning of a sequence and can operate on that sequence accordingly. Furthermore, semantics on the semantic heap 503 can be referenced by a symbolic equivalent, which may occur in later portions of the same message, or the meta-level semantic may be used in later stage processing within an entirely different message. Therefore, meta-level semantics have a lifetime beyond the particular message in which it is created, manipulated, or executed upon.

The semantic stack 504 refers to the unit in the exemplary module 500 responsible for storing semantics which are acted upon and/or created via semantic codes/instructions. One type of semantic which can be placed upon the stack 504 includes those referenced within the semantic heap 503. Other types of semantics which can be placed upon the semantic stack 504 include data primitive types common to XML as defined by the W3C XML Schema Part 2: Datatypes Second Edition, for example. Therefore simple types such as integer or data/time and others can be stored and acted upon within the semantic stack 504 by semantic codes/instructions. As a result, the execution module 500 is able to execute instructions well beyond those executable by common architectures by exploiting the fact that social networks work in concepts and abstractions, which are difficult to represent in simple data types. In addition, it is noted that the execution module 500 can also process semantics defined in the W3C RDF/XML Syntax Specification (Revised) and its variants including, but not limited to, the W3C OWL Web Ontology Language, or the Notation3 (N3) specification which is a shorthand non-XML serialization of the aforementioned RDF models, for example.

The control heap 505 refers to the unit in the exemplary execution module responsible for storing control level meta-level semantics. Meta-level control semantics are special case semantics which may include structural meaning. As a result, these control semantics are different from previously discussed. Indeed, control meta-level semantics cover a range of definitions encompassing structures which fork, loop, test on conditionals, branch to different places, etc. based on a local state. As such, these meta-level control structures impose a specific meaning (or action or qualifier) upon a particular sequence of semantics. While meta-level control semantics, like those of the semantic stack 504, may be acted upon as a group, meta-level control semantics within the control heap 505 may individually envelope and impose additional controls upon the semantic stack 504 semantics. This separation of control from execution is important for many reasons including, without limit, it allows for the use meta-level data as a means to insert or delete additional instructions into a message sequence.

To illustrate, take for instance a looping sequence, which at the end returns to its beginning. The method by which the return occurs may not be fixed as in compiled programs since the return point maybe variable depending on whether the sequence has been modified via the insertion or deletion of addition instructions (as discussed above). This invention recognizes that the separation of the sequence from the control makes it possible to manipulate both entities more efficiently allowing for the infinite possibility of rewriting both the sequence and the control meta-level semantics on the fly. This permits the introduction of self-modifying code in a realtime context, something which modern day software can not begin to emulate.

The state core 506 refers to the unit in the exemplary execution module 500 responsible for storing state, as well as the overall message execution environment. The term "state", as used herein, refers to the particular status of an execution session, which includes the execution module and the particular message being executed by said execution module. As noted above, a message may comprise one or more instructions to be executed. State refers to the status of such execution, and may include execution parameters such as errors, exception, etc.

The fetch unit 507 refers to the unit in the exemplary execution module 500 responsible for the fetch-lookup-execute loop of the said module 500. The fetch unit 507 may access the symbol I/O unit 501 to acquire a symbol which it passes onto the lookup unit 508 (discussed further below). The fetch unit 507 may also access the state core 506 to ascertain the state of the execution module 500. Depending on the symbol I/O unit 501 and the state core 506, the fetch unit 507 may determine if the fetch-lookup-execute loop is completed (whereby the thread of control is returned to the module controller 510) or if there is a valid symbol which can be passed to the lookup unit 508.

The lookup unit 508 refers to the unit in exemplary execution module 500 responsible for translating symbols (or symbolic tags) of a semantic to an actual semantic handle. The lookup unit 508 accesses the semantic core/extensions units 502a/502b as well as the semantic heap unit 503. These units (502a/502b, 503) contain semantics referenced by a symbol which the lookup unit 508 may resolve. If no semantic is found for a particular symbol, the execution module 500 may be placed into a forwarded state. A forwarded state is indicative that the current computing peer (hosting the execution module 500) does not host said semantic (for the particular symbol) and as a result, the thread of control of the message comprising said symbol is passed to the module controller 510. The module controller 510 may then temporarily suspend or 'freeze dry' the current execution session, which may then be passed to a different computing peer as an outflow message 512 to continue the thread of execution.

The term 'freeze drying' refers to the process of saving an entire state of an execution session in a format which allows it to be reinstated at a later time, such that the execution session may continue as if it never ceased. The freeze-dried session may include all parsed symbols, all unparsed symbols, instructions or sequences referenced by symbols, data types pushed to the execute stack, execution structures pushed to the control stack, and the state of the module controller 510.

Freeze drying is also the means by which execution sessions may be moved from one peer to another seamlessly until an entire execution session lifecycle is completed. Once an execution session is freeze dried, it may be sent to a peer capable of continuing execution of the session. If a peer is not available to continue the session, the freeze-dried session may be stored for any length of time until a suitable peer becomes available. One method of finding a suitable peer (to continue the execution session) is to query a computing network. This querying may include cache based lookup, network search and discovery, RDF (Resource Description Framework)/XML based language queries, etc. In instances where there are multiple computing peers capable of continuing an execution session, it is up to the host peer's response handlers to decide which of the available peers will receive the freeze-dried session. In making such a selection, the host peer may use criteria that includes, without limit, cost and performance analysis, network proximity, time and priority, quality of service, rank order within the peer computing network, recommendation based selection, etc.

The execute unit 509 refers to the unit in the exemplary module 500 responsible for invoking a semantic handle and providing the appropriate environment for executing message symbols. The execute unit 509 operates on an inversion of control architecture, which isolates the environment whereby the semantic handles are controlled. Inversion of control operates on the premise of 'don't call us, we'll call you', whereby semantic handles do not take control, but expect to be controlled and have everything handed to them via the environment provided by the execution module 500. This architectural feature allows for improved handling of dependency control, lifecycle control, resource control, exception handling.

The module controller 510 refers to the unit in the exemplary module responsible for taking message in-flow 511 and instantiating the various units of the execution module 500 so as to affect execution of said message 511. As noted above, this module controller 510 is also responsible for freeze-drying execution messages and sending them out as outflow 512. In essence, the module controller 510 is responsible for the setup and tear down of the execution environment for each and every inflow 511 and outflow 512 message.

Figure 6:
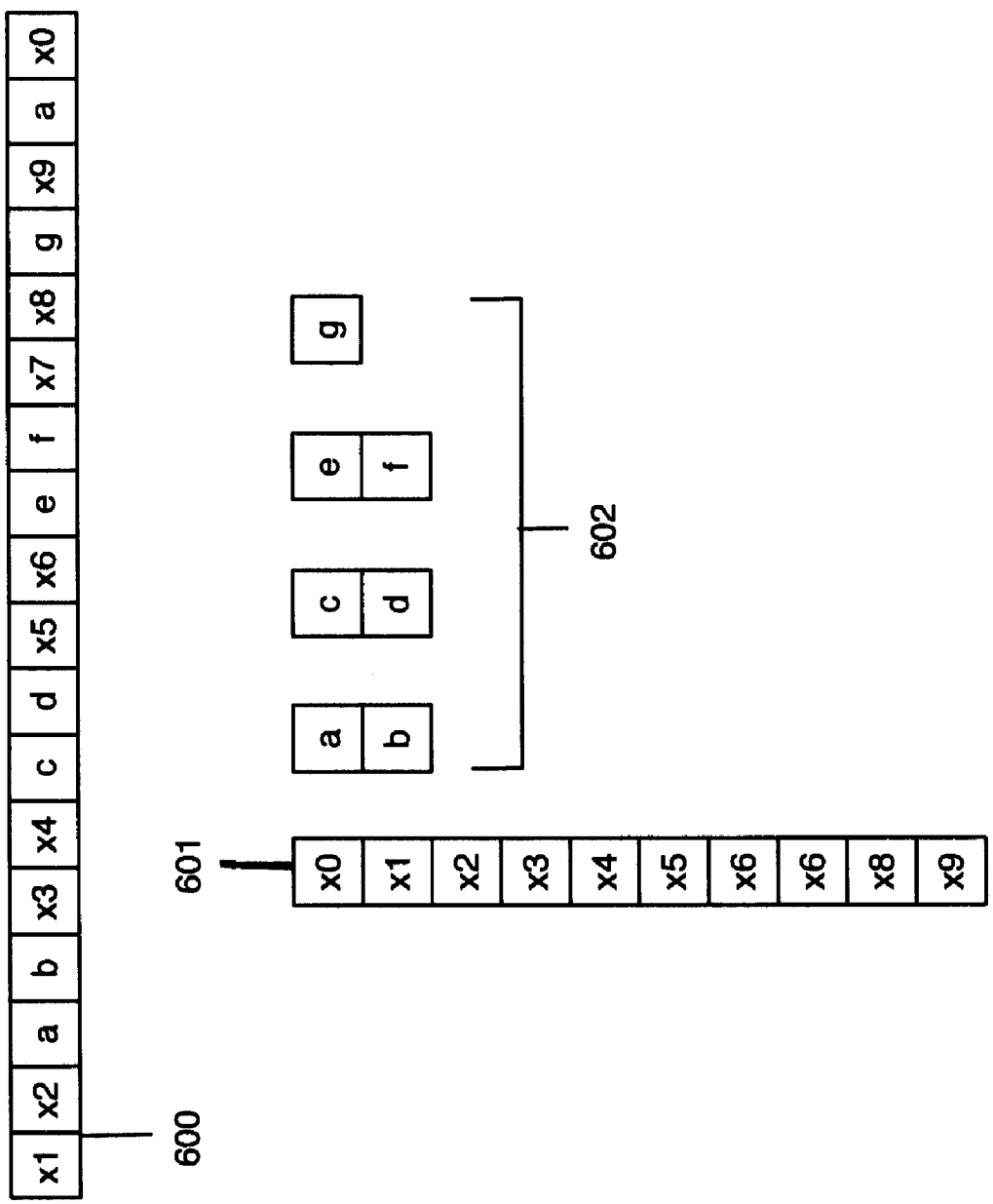
FIG. 6. shows an exemplary program instruction comprising both common and extension instructions.

Referring now to FIG. 6, an exemplary program instruction sequence 600 is shown. Included within the exemplary sequence 600 are a set of 'core' or common symbols 601, and semantic 'extension' symbols 602. As discussed above, 'core' symbols are those that are common to all peers of a computing social network. As a result, any peer within said computing social network will be able to fully execute all of the core symbols 601 within said sequence 600. The semantic 'extension' symbols 602 are those symbols which require additional functional capabilities (above and beyond the 'core' capabilities of a common peer). Thus, not all peers in the computing social network will be able to execute the extensions 602. To the contrary, only those computing peers configured with the extension capabilities will be able to execute the listed extension symbols 602. If no single peer in the network is capable of executing the entire sequence 600, then the sequence 600 may be executed 'socially' via distributing said sequence 600 among several peers (each having one or more of the extension capabilities) who collaborate to execute one or more symbols until the entire sequence 600 is executed. An example of this collaborative execution is further discussed below with regard to FIG. 7.

For illustrative purposes, the exemplary program instruction sequence 600 may be described mathematically by a 7 element tuple=$(Q,P,\Gamma,\Sigma,\delta,A,Z)$, wherein Q is a finite set of initial states {pending, route, forward}

P is a finite set of accepting states {done, interrupted, error, forward, route, pending, unknown}

$\Gamma$ is an infinite set of symbols (common core symbols plus semantic extension symbols plus literals)

$\Sigma$ is the sequence of symbols (e.g. the program instruction sequence 600) $\{\Sigma \subseteq \Gamma\}$ $\delta$ is relation on states and symbols called the transition relation $\{\delta: Q \times \Sigma\}$ A is the initial state $\{A \epsilon Q\}$ Z is the final state $\{Z \epsilon P\}$ As illustrated, the exemplary sequence 600 includes 18 symbols $(\Sigma \subseteq \Gamma)$, where $(x0-x9 \subseteq \Gamma$ represent a subset of common core symbols) and $(a-g \subseteq \Gamma$ represent a subset of semantic extensions), where $(A=\text{pending}, A \subseteq Q$ represents an initial pending conversation), where ($\delta$ is the result of executing $\Sigma$), where ($Z \epsilon P$, where pending implies freeze-drying state, route implies moving thread of execution from one peer to another named peer, forward implies finding a peer within the social network capable of continuing the thread of execution, finished implies the conversation is finished successfully and dealt with as appropriate to the response handlers, interrupted implies the conversation is forced to cease and dealt with as appropriate to the response handlers, and where error implies the conversation failed and dealt with as appropriate to the response handlers). It should be understood that the exemplary program instruction sequence may be comprised of more or less total symbols, and wherein the total symbols may include any number of common core symbols, any number of semantic extensions, and any number of variants thereof known as literals. Literals may be considered in the domain of numbers and strings and other data types (semantic data types).

In view of the mathematical representations above, the common or core symbols may be expressed as $\{x0-x9 \subseteq \Gamma\}$, and semantic extensions may be expressed as $\{a,b,c,d,e,f,g \subseteq \Gamma\}$. As noted above, one or more of these semantic extensions may be present in one or more peers. As a result, it may require multiple peers to fully comprise the necessary functionality to fully execute the entire program instruction sequence 600.

Figure 7:
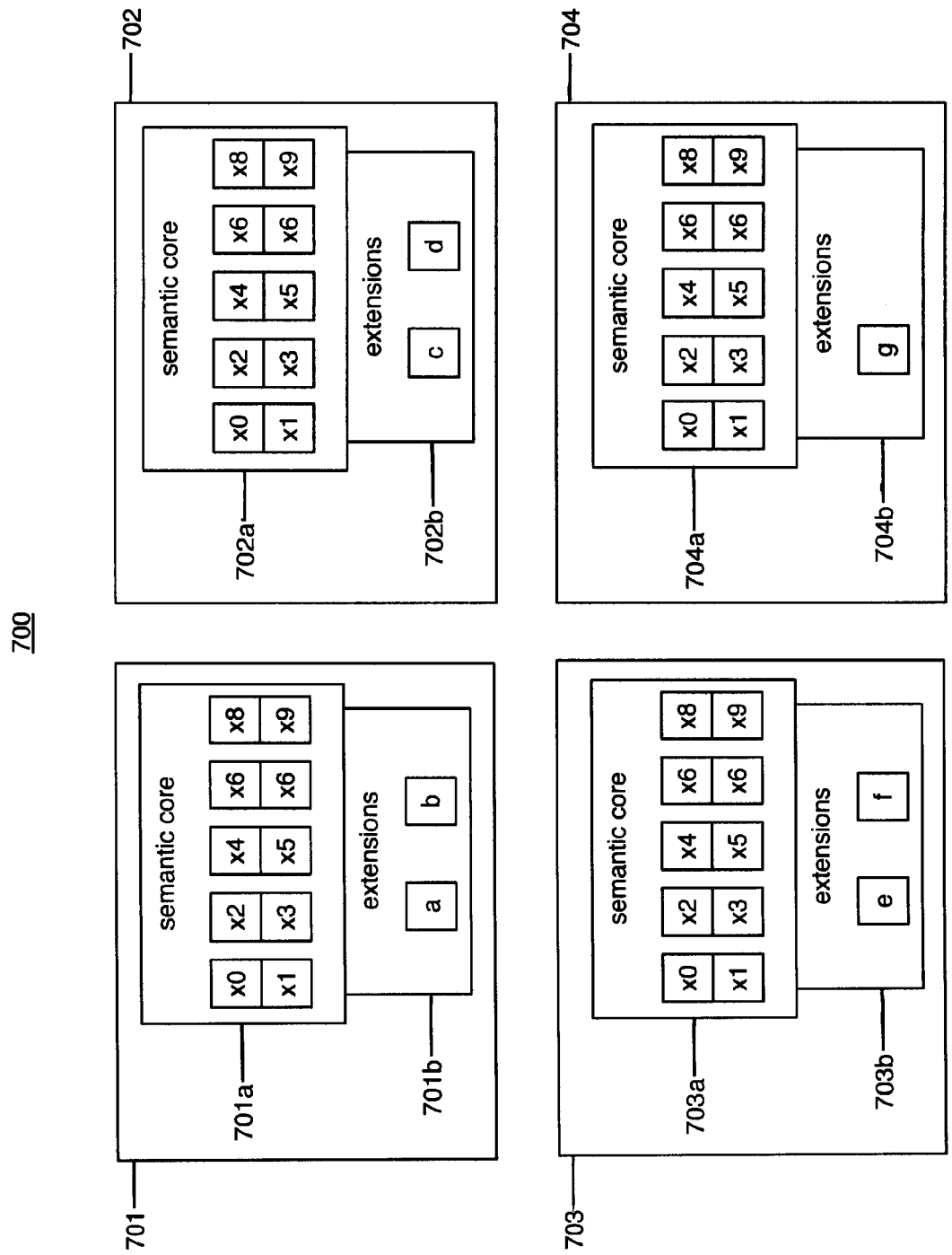
FIG. 7. shows an exemplary computing social network configured for collaborative execution of an program instruction sequence comprising both common and extension symbols.

Referring now to FIG. 7, an exemplary computing social network 700 configured for collaborative execution of a program instruction sequence is shown. As shown, each peer (701-704) in the network 700 comprises a respective semantic core (701a-704a) and semantic extensions (701b-704b).

As a result, each peer 701-704 may execute any of the common or core symbols x0-x9, but only peer 702 is able to execute extension symbols a and b, only peer 703 is able to execute extension symbols c and d, only peer 703 is able to execute extension symbols e and f, and only peer 704 is able to execute extension symbol g. However, since each peer 701-704 comprises a respective semantic core 701a-701b, the peers 701-704 may communicate with each other and collaborate to utilize each other's semantic extension capabilities.

For example, and solely for purposes of illustration, reference is again made to the exemplary program instruction sequence 600 of FIG. 6. No one peer of the network 700 is capable of executing the entire instruction sequence 600 by itself. However, collectively, the peers 701-704 may collaborate to execute the program instruction sequence 600.

For purposes of this illustration, it is assumed that sequence 600 begins at peer 701. As a result of its semantic core 701a and extensions 701b, peer 701 is able to execute the first six symbols of the sequence 600 (i.e., x1, x2, a, b, x3, x4). The next symbol, c, is not executable in peer 701. As a result, peer 701 may freeze-dry the execution session (as discussed above), insert an instruction to send the session to peer 702, and send the freeze-dried session (or a portion thereof) to peer 702 which is capable of continuing execution of the sequence 600. Peer 701 (and all of the other peers 702-704) may query or have prior knowledge of the capabilities of the peers within the network 700.

Once the freeze-dried session arrives at peer 702, peer 702 're-hydrates' the session (i.e., the reverse of freeze-drying) and continues to execute the sequence 600. Based on its semantic core 702a and extensions 702b, peer 702 executes the next four symbols (i.e., c, d, x5, x6). Peer 702 is incapable, however, of executing the subsequent symbol, e. Thus, similar to peer 701, peer 702 may freeze-dry the execution session (and optionally insert and/or remove instructions) and send the session to peer 703 to continue execution. It should be noted that peer 701 may have inserted instructions to dictate to peer 702 to stop after symbol x6, or peer 706 could have deduced it on its own. In fact, peer 701 could have inserted instructions to guide the execution throughout the entire network, to minimize the input required by the additional peers, or to delete previously inserted instructions to maximize efficiency, for example.

Once peer 703 receives the freeze-dried session, it may similarly re-hydrate the session and continue to execute the sequence, including symbols e, f, x7 and x8. At that point, the session may again be freeze-dried (in a manner similar to those discussed above) and sent onto peer 704 to execute symbols g and x9; and back to peer 701 to complete execution of the sequence 600 with the execution of symbols a and x0.

Thus, as illustrated above, each of the four peers 701-704 may collaborate to execute a complex sequence 600, thereby exploiting the capabilities of the entire network 700. It should be noted that this type of collaborative execution is not limited to four peers, or to any number of sequences. To the contrary, a collaborative network of peers in accordance with the present invention may comprise any number of peers, and they may collaborate to execute any number of sequences or symbols, whether serially or in parallel.

As will be appreciated by those of skill in the art, the novel utility computing methods, program/instruction migration, computing social networks, and/or social peer discussed above may be implemented in countless industries and applications. For illustrative purposes, embodiments of the present invention will be described in terms of the Video Gaming, Supply Chain, Security, and Health Care industries. It should be understood, however, that the present invention is not limited thereto. To the contrary, the present invention may be implemented in any industry.

As a first example, the present invention may be implemented to improve the overall gaming experience for users by expanding the functionality, efficiency, and abilities of gaming devices and by improving communications amongst users and/or gaming devices. In such an implementation, gaming devices such as cameras, video game consoles, portable video gaming consoles, web cameras, may be configured as network peers in accordance with the present invention. As a result, a gaming program being played say, on a video game console, may be migrated onto a handheld gaming console, where gaming may continue. To illustrate, if a user were playing a video game on a Playstation 3®, for example, the user may migrate the actual gaming session onto his handheld PSP® (or iPod, or any other hand held device) and continue his gaming experience seamlessly. The user may then migrate the gaming session onto another gaming console (e.g., XBOX 360®) at a remote location.

In another gaming example, a user may use network peers (e.g., servers, cameras, GPS devices, etc.) to create a virtual game, wherein the scenery of the game is taken from the user's actual environment.

In yet another gaming example, a user may have a game which interacts on their mobile device in a very personal fashion, and as soon as a friend or some other vetted participant comes into close proximity to said user, the interactive game migrates from the said users mobile device to the other participant's device. In this example, the network of peers forms the interactive game environment for components to migrate and continue operation on different peers where the migrating interactive game may end up back on the originating user should said user enter into proximity of a hosting participant. This example illustrates the ability to execute gaming experiences outside the originating device, thereby converting network peers into a multi-user, multi-device interactive gaming platforms.

In a Supply Chain industry, networked peers (e.g., monitors, RFID tags, servers, inventory scanning devices, etc.) may be used for just-in-time (JIT) manufacturing and/or JIT-based ordering. As goods are consumed or ordered, the various peers can communicate inventory levels to each other and as a result, trigger alerts such as 'time to increase/decrease manufacturing levels', 'time to order additional raw materials', etc.

In the Security industry, the present invention may be used to improve security and/or adjust security levels according to the particular characteristics of data being communicated between peers. For example, rather than simply treating all data with the same level of security (which can be very expensive), data may be classified such that highly confidential information (e.g., business documents, legal communications, etc.) may be highly secured, and public data (e.g., public photos, public information, etc.) may be transmitted with no security at all. This classification may be included as part of a message or instruction set as meta-data.

Continuing in the Security industry, the present invention may be used to take advantage of a "Zero-Knowledge Proof" security scheme. Under such a scheme, partial information may be sent from each of a sub-group of peers in order to create a community key. This community key will not be known to any one peer in the sub-group, nor will peers which are not 'members' of the particular sub-group be able to participate in secure communications with the sub-group. As a result, sub-groups of peers within a computing social network will be able to communicate confidentially, without having to worry about any other peer listening in, or without having to worry about any one peer within the sub-group divulging the key. In instances where a secure communication must pass through one or more peers which are not members of the secure sub-group, the communication may be wrapped in layers of encryption, one each for each non-sub-group peers that must receive and pass the communication along. As the communication arrives at each peer, one layer of encryption is removed until the communication reaches its destination peer. By the time the communication reaches the destination peer, only one layer of encryption will remain, and this layer may only be decrypted with the 'zero-knowledge' community key.

In the Healthcare industry, the present invention may be utilized to bring treatment to those patients whom themselves can not (or may not have time to or may not have the immediate means to) attend a hospital or doctor's office to receive treatment. For example, rather than attending a doctor's office to receive an EKG or a blood test, devices configured for taking and communicating EKG or blood test readings may further be configured as network peers according to the present invention. This way, a patient may take his own EKG reading or a blood test, and have the results thereof communicated to server peer at the doctor's office or hospital.

The present invention may also be used to locate physicians, hospitals, or pharmacies when traveling outside of one's local area, or to enable secure communications between doctors and patients. To illustrate, if a patient is traveling on vacation, but forgets his/her prescription, the patient may use his/her networked peer to communicate the lost prescription to his/her doctor. The doctor may then use his networked peer to locate a pharmacy that is near the patient, and forward a new prescription to that pharmacy. Peers at the doctor's office and/or pharmacy may then communicate to the patient that the prescription has been filled and is ready for pick up, and provide driving directions from the patient's current location to said pharmacy.

As noted by the illustrative examples above, the present invention may be implemented into any industry where communications and computing functionality may be improved.

In summary, the present invention is directed to methods, apparatus, software and hardware for utility computing in ad-hoc and configured peer-to-peer networks, that include (among others) the following features:

a. mobile device software platform that resides on a wireless communications network, rather than on the mobile device itself;

b. using a communication network (whether wired, wireless, ad-hoc, and/or configured) to function as a microprocessor for the software platform, with each peer in the network comprising its own operating system and individual program execution capabilities;

c. using a peer-to-peer infrastructure for enabling shared program execution power/ability amongst a social network of devices within the same or in different computing social networks (akin to "utility computing");

d. use of a proprietary 'iDNA' programming language which uses recursive structures to semantically "wrap" or encapsulate software applications to enable them to function as instructions that are readable by peers in the network;

e. each peers in the social network having a common or 'core' set of instructions, in addition to having its own individual instructions representing the ability to execute one or more different software applications;

f. instructions are sequenced and executed in order; one peer executes all instructions until it reaches an instruction it can not execute, at which point it will search for a peer to execute; the execution path may be akin to a post priori schedule (i.e., the start and end of the instruction sequence is known, however, the actual path taken to complete the sequence is unknown);

g. alternatively, execution paths may be chosen according to previously defined routing tables; or they may be suggested by the system;

h. utility execution is accomplished without downloading any code onto the network peers; as a result, there is no chance of infecting the network peers with a virus;

h. since networks are dynamic insofar as their topology may constantly be changing, the present invention updates and determines 'best paths' for routing execution instructions according the current network topology;

i. the program instructions of the present invention (i.e., semantically encapsulated software applications) may be used and re-used to generate new or revised programs;

Other key aspects of the present invention include:

a. the present invention provides novel means and methods for building collaborative peer-to-peer systems;

b. unlike traditional peer-to-peer system which are "data sharing" centric, instances (i.e., devices and/or networks) of the invention are "execution and computational sharing" centric—in other words, all forms and usages of computing and computing resources are shared and accessible to any peer as if the peer natively hosted said computing and/or computing resources;

c. the present invention may be implemented using both fixed (immobile) and mobile devices;

d. devices configured in accordance with the present invention can connect to each other and/or networks using traditional network connections and/or wireless proximal ad-hoc connections;

e. connection frameworks may utilize the broadcasting abilities inherent to mobile radio units;

f. connection frameworks may utilize the routing capability from device to device;

g. mix-and-match connections (e.g., wired and wireless) may be used to achieve sub-optimal to optimal network configurations;

h. multiple and mutually exclusive and independent peer and network configurations may be derived from the present invention;

i. an instance of invention does not require a central server, thereby enabling devices (peers) which support mobile radio sets to create proximal networks for devices which may not be in range of a wireless access point;

j. an instance of the present invention may run collectively among proximal devices (e.g., mobile radio sets), fixed devices, or a combination of both;

k. an instance of the present invention does not require network administration to be setup;

l. an instance of the present invention supports devices entering and exiting network configurations without having to 'know' about the devices in advance, thereby creating ad-hoc collaborative systems which may be in a constant state of flux, while maintaining the ability to run existing applications and engage in utility computing/execution;

m. an instance of the present invention supports distributed computing among computing devices;

n. an instance of the present invention may offload memory/processor intensive work from a mobile computing device to a collaborative network of peers which may include fixed computing servers, for example, where said work is executed and results of said work are returned to any number of possible destinations, one of which maybe the original mobile computing device;

o. an instance of the present invention can build a system where multiple and different computing devices as well as standalone devices may participate with each other simultaneously;

p. an instance of the present invention provides security preventing peers or other forms of computing devices or network hardware which are not part of the collaborative environment from 'understanding' the conversational content of said environment, thus providing "peer confidentiality"

q. an instance of the present invention prevents peers or other forms of computing devices or network hardware which are not authorized to participate in a particular peer-to-peer 'conversation' from participating in any aspect of said restricted or secured conversation, even though they are permitted within the confidential sphere of a said network;

r. an instance of the present invention may prevent peers from performing and/or executing any or all aspects of a conversation without proper and valid authentication of capability and "execution environment" intent—thus providing "execution environment" authentication and execution sandbox protection;

s. an instance of the present invention where peer to peer authentication is based on zero-knowledge proofs and therefore do not require a central server or a shared encryption key—thus providing for a collaboration environment which is self-secured and can not be coerced for encryption information t. an instance of the present invention enables peers to be aware of other peers' capabilities and 'intent' and therefore create on-the-fly knowledge representations of the peer environment—thus providing for dynamic routing tables for conversations;

u. an instance of the present invention enables peers to facilitate in the migration and transfer of a conversation based on the intended results of the conversation and the intended purpose(s) of said peers in configuration—thus providing for realtime routing optimization;

v. an instance of the present invention supports applications which may execute on top of the whole such that the "execution environment" morphs and migrates across a sub-set of peers in order to achieve the execution results;

w. an instance of the present invention supports multiple mutual exclusive and independent "execution environments" known as conversations—said conversations may involve as many peers required to achieve its completion where said conversations migrate from one peer to another peer or to multiple peers in the case of multicast conversations in order to execute x. an instance of the present invention supports conversations being altered, mutated, rewritten, and self-modified in order to achieve an execution objective, thus conversations are dynamic and the nature and content can change to achieve objective;

y. an instance of the present invention supports conversation containing instructions common to all peers regardless of their configuration, and may also contain instructions which are specific to a single peer or group of peers;

z. an instance of the present invention provides for routing conversations using information provided by one or more peers in a group;

aa. an instance of the present invention enables conversations to "execute" in different spatial configurations (e.g., different peers during its execution lifetime) or in different temporal configurations (e.g., conversation is postponed due to restricted resources, key peer missing from conversation, stored-and-forward at a specified future time, or triggered when certain events take place);

bb. an instance of the present invention may be used to offer or 'lease' one or all of the collaborative functional abilities of a group of collaborative peers to other peers that are not a part of the collaborative network—in other words, the present invention supports leasing of network conversations, services, peer participation, peer group affiliation, connections, collaboration, etc.

cc. an instance of the present invention creates new means and methods for creating ad-hoc collaborative utility computing of scale and of reach;

Although the invention has been described in terms of exemplary embodiments/features, it is not limited thereto. Rather, the foregoing description should be construed broadly to include other variants and embodiments of the invention which may be made by those skilled in the art without departing from the scope and range of equivalents of the invention. This disclosure is intended to cover any adaptations or variations of the embodiments discussed herein.

The methods and apparatus as described above with reference to the foregoing description and appended drawings is hereby claimed.

The invention claimed is:

1. A method of executing a program structure by leveraging a peer-to-peer network, the method comprising:
   generating a non-compiled program structure comprising a plurality of non-compiled program instructions, wherein one or more of said program instructions comprises meta-data that provides information relating to the functional capabilities required to carry-out said one or more program instructions, said meta-data being readable by each of a plurality of network peers;
   executing a portion of fewer than all of the non-compiled program instructions in a first of said plurality of network peers which initiates the execution of compiled code hosted by said first network peer, wherein executing said portion comprises reading meta-data and determining whether said first network peer hosts said compiled code;
   migrating one or more of the non-compiled program instructions, together with any requisite data, to at least one other of the plurality of network peers; and
   continuing execution of the non-compiled program structure in said at least one other network peer.

2. The method of claim 1, wherein at least one program instruction itself comprises one or more other program structures.

3. The method of claim 1, wherein said first network peer migrates the entire program structure, together with any requisite data, to the at least one other network peer for continued execution of said program structure.

4. The method of claim 1, further comprising writing and inserting one or more program instructions into the program structure after the program structure has begun execution.

5. The method of claim 1, wherein at least one program instruction does not invoke the execution of code, but rather controls the manner in which said program structure is executed, said at least one program instruction comprising constraints, said constraints comprising one or more of a time to perform, a cost to perform, a priority to perform, and a location to perform one or more program instructions.

6. The method of claim 1, wherein at least one program instruction causes the insertion or deletion of one or more program instructions into the program structure.

7. The method of claim 1, wherein the migrating step comprises:
   said first network peer querying one or more network peers to identify the at least one other network peer; and
   transferring one or more program instructions, together with any requisite data, to said at least one other network peer,
   wherein said first network peer comprises a network peer in possession of the program structure and wherein said at least one other network peer comprises a network peer identified as capable of continuing execution of the transferred program instructions.

8. The method of claim 7, wherein the first network peer, in response to said querying step, receives information relating to one or more capabilities of one or more of the plurality of network peers, the method further comprising:
   creating and storing a record of said capabilities; and
   evaluating said record to identify said at least one other network peer.

9. The method of claim 1, further comprising repeating the migrating step until one or more objectives of the program structure are achieved.

10. The method of claim 1, wherein the first network peer encounters at least one program instruction that calls for the execution of code that is not hosted by said first network peer, and wherein the at least one other network peer is identified as hosting and as being capable of executing said code, the method further comprising:
    migrating said at least one program instruction together with any requisite data, to said at least one other network peer,
    said at least one other network peer executing the code called for by said at least one program instruction.

11. The method of claim 1, wherein the plurality of network peers comprises one or more selected from the group consisting of personal computers, servers, mobile telephones, pagers, personal digital assistant (PDA), radio frequency identification (RFID) devices, data sensors, kiosks, automatic teller machines (ATMs), wireless fidelity (WiFi) access points, routers, embedded multi-dimensional barcodes, global positioning (GPS) devices, gaming devices, multi-media devices, cable set-top boxes, digital still and motion cameras, surveillance equipment, healthcare monitoring equipment, medical imaging devices, and assembly line components.

12. A system for executing a program structure by leveraging a peer-to-peer network, the system comprising:
    a plurality of network peers in communication with each other, each of said network peers comprising a memory for storing code, and a processor for executing said code, at least a first of said network peers comprising code that when executed causes said first network peer to:
    generate a non-compiled program structure comprising a plurality of non-compiled program instructions, wherein one or more of said program instructions comprises meta-data that provides information relating to the functional capabilities required to carry-out said one or more program instructions, said meta-data being readable by each of the plurality of network peers;
    read meta-data and determine whether said first network peer hosts the compiled code needed to carry-out one or more of said non-compiled program instructions;
    execute at least a portion of the non-compiled program instructions which initiate the execution of additional compiled code hosted by said first network peer;
    migrate one or more of the non-compiled program instructions, together with any requisite data, to at least one other of the plurality of network peers; and
    continue execution of the one or more non-compiled program instructions received from any other of the network peers.

13. The system of claim 12, wherein at least one of said network peers comprises code that when executed, causes said network peer to write and insert one or more program instructions into the program structure to control the manner in which said program structure is executed, said program instructions comprising constraints, said constraints comprising one or more of a time to perform, a cost to perform, a priority to perform, and a location to perform one or more program instructions.

14. The system of claim 12, wherein at least one of the program instructions initiates the insertion or deletion of one or more program instructions into or out of the program structure after the program structure has begun execution.

15. The system of claim 12, wherein at least said first network peer further comprises code that when executed, causes said first network peer to query one or more network peers to identify at least one other network peer; and to transfer one or more program instructions, together with any requisite data, to said at least one other network peer,
 wherein said at least one other network peer comprises a network peer identified as capable of continuing execution of transferred program instructions.

16. The system of claim 15, wherein said first network peer, in response to said querying step, receives information relating to one or more capabilities of one or more of the plurality of network peers, at least said first network peer further comprising:
 code that when executed, causes said first network peer to create and store a record of said capabilities; and evaluate said record to identify said at least one other network peer.

17. The system of claim 12, wherein at least one program instruction itself comprises one or more other program structures.

18. The system of claim 12, wherein the plurality of network peers comprises one or more selected from the group consisting of personal computers, servers, mobile telephones, pagers, personal digital assistant (PDA), radio frequency identification (RFID) devices, data sensors, kiosks, automatic teller machines (ATMs), wireless fidelity (WiFi) access points, routers, embedded multi-dimensional barcodes, global positioning (GPS) devices, gaming devices, multi-media devices, cable set-top boxes, digital still and motion cameras, surveillance equipment, healthcare monitoring equipment, medical imaging devices, and assembly line components.

* * * * *